United States Patent
Lu et al.

(10) Patent No.: US 9,877,228 B2
(45) Date of Patent: Jan. 23, 2018

(54) OVERLOAD CONTROL METHOD, AND DEVICE

(71) Applicant: Huawei Technologies Co., Ltd., Shenzhen (CN)

(72) Inventors: Wei Lu, Shanghai (CN); Fenqin Zhu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 87 days.

(21) Appl. No.: 14/939,860

(22) Filed: Nov. 12, 2015

(65) Prior Publication Data

US 2016/0073289 A1    Mar. 10, 2016

Related U.S. Application Data

(63) Continuation of application No. PCT/CN2013/075555, filed on May 13, 2013.

(51) Int. Cl.
  *H04W 28/12* (2009.01)
  *H04W 28/02* (2009.01)

(52) U.S. Cl.
  CPC .............................. *H04W 28/0289* (2013.01)

(58) Field of Classification Search
  CPC .............................................. H04W 28/0289
  See application file for complete search history.

(56) References Cited

U.S. PATENT DOCUMENTS 9,226,206 B2 * 12/2015 Ishii ..................... H04W 8/082
9,602,440 B2 *  3/2017 Anpat ................... H04L 12/28
(Continued)

FOREIGN PATENT DOCUMENTS

CN    101459928 A    6/2009
CN    101778039 A    7/2010
(Continued)

OTHER PUBLICATIONS

"3rd Generation Partnership Project; Technical Specification Group Services and System Aspects; General Packet Radio Service (GPRS); Service description; Stage 2 (Release 12)," 3GPP TS 23.060, V12.0.0, pp. 1-338, 3rd Generation Partnership Project, Valbonne, France (Mar. 2013).
(Continued)

*Primary Examiner* — Jay P Patel
(74) *Attorney, Agent, or Firm* — Leydig, Voit & Mayer, Ltd.

(57) ABSTRACT

The present invention discloses an overload control method, a gateway device, a mobility management entity, and a PGW. The method includes: determining, by a gateway device, first overload indication information, where the first overload indication information is used to indicate an overload control policy; and sending, by the gateway device, the first overload indication information to a mobility management entity, so that the mobility management entity executes the overload control policy according to the first overload indication information. According to the overload control method, the gateway device, the mobility management entity, and the PGW in embodiments of the present invention, adverse impact brought by device overload can be avoided; therefore, the device overload can be effectively controlled.

15 Claims, 17 Drawing Sheets

(56) References Cited

U.S. PATENT DOCUMENTS

| | | | |
|---|---|---|---|
| 2002/0150048 A1* | 10/2002 | Ha | H04L 1/1887 370/231 |
| 2004/0185867 A1 | 9/2004 | Wassew et al. | |
| 2005/0190748 A1 | 9/2005 | Nguyen et al. | |
| 2008/0084825 A1* | 4/2008 | Lee | H04L 1/1816 370/236 |
| 2011/0090795 A1* | 4/2011 | Li | H04L 43/0829 370/235 |
| 2011/0312313 A1 | 12/2011 | Hiraga et al. | |
| 2013/0035100 A1* | 2/2013 | Murakami | H04W 92/20 455/436 |
| 2013/0088956 A1 | 4/2013 | Zhou et al. | |
| 2013/0286828 A1 | 10/2013 | Cho et al. | |
| 2014/0050095 A1* | 2/2014 | Szilagyi | H04L 1/0002 370/236 |
| 2014/0248868 A1* | 9/2014 | Wang | H04W 24/10 455/422.1 |
| 2014/0355417 A1* | 12/2014 | Kim | H04W 24/04 370/221 |
| 2015/0156807 A1* | 6/2015 | Guo | H04W 76/023 370/329 |
| 2016/0057652 A1* | 2/2016 | Chandramouli | H04W 28/0289 370/235 |

FOREIGN PATENT DOCUMENTS

| | | |
|---|---|---|
| EP | 1906589 A1 | 4/2008 |
| EP | 2563070 A1 | 2/2013 |
| JP | 2000253452 A | 9/2000 |
| JP | 2003070059 A | 3/2003 |
| JP | 2004531964 A | 10/2004 |
| JP | 2012004934 A | 1/2012 |
| WO | wo 2011130912 A1 | 10/2011 |
| WO | WO 2012093832 A2 | 7/2012 |

OTHER PUBLICATIONS

"3$^{rd}$ Generation Partnership Project; Technical Specification Group Services and System Aspects; General Packet Radio Service (GPRS) enhancements for Evolved Universal Terrestrial Radio Access Network (E-UTRAN) access (Release 12)," 3GPP TS 23.401, V12.0.0, pp. 1-290, 3$^{rd}$ Generation Partnership Project, Valbonne, France (Mar. 2013).

3$^{rd}$ Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12); 3GPP TS 29.274, V12.0.0, pp. 1-228, 3$^{rd}$ Generation Partnership Project, Valbonne, France (Mar. 2013).

* cited by examiner

800

A mobility management entity sends a first control request
message to an SGW, so that the SGW sends a second control
request message to a packet data network gateway PGW and
receives a second control response message sent by the PGW,
where the second control response message carries second
overload indication information that is determined by the PGW
and used to indicate an overload control policy  — S850

The mobility management entity receives a first control
response message sent by the SGW, where the first control
response message carries first overload indication information,
and the first overload indication information is the second
overload indication information forwarded by the SGW, or the
first overload indication information is determined by the
SGW according to the second overload indication information
and signaling sending statuses of mobility management entities
connected to the SGW  — S813

The mobility management entity executes the overload control
policy according to the first overload indication information  — S820

FIG. 11

OVERLOAD CONTROL METHOD, AND DEVICE

CROSS-REFERENCE TO RELATED APPLICATIONS

This application is a continuation of International Patent Application No. PCT/CN2013/075555, filed on May 13, 2013, which is hereby incorporated by reference in its entirety.

TECHNICAL FIELD

The present invention relates to the communications field, and more specifically, to an overload control method, a gateway device, a mobility management entity, and a packet data network gateway (Packet Data Network Gateway, PGW).

BACKGROUND

In actual network deployment, each network device may be connected to multiple other node devices. For example, a serving gateway (Serving Gateway, SGW) is connected to multiple mobility management entities or connected to multiple PGWs. A process in which a terminal device accesses a network and uses a communications network to perform communication is complex. First, a process in which the terminal device accesses the network upon power-on is an attach process, and after the attach process is successfully completed, the terminal device accesses the network. Then, when the terminal device uses a network resource to perform communication, a bearer resource needs to be established, so as to implement data transmission. Then, a process of establishing a bearer needs to be performed. If quality of service (Quality of Service, QoS) of the bearer resource needs to be modified in a communication process, possibly, a process of modifying the bearer resource needs to be performed. In addition, when a user does not use the terminal device to perform communication for a long time, the terminal device may switch to an idle state, and if the user re-initiates a service, such as a voice call or Internet surfing, the terminal device initiates a service request process and switches from the idle state to a connected state. An actual communication process is quite complex and includes many processes, for example, separation process or an event reporting process such as location reporting.

In some scenarios, for example, a large quantity of users are moved on some transportation tools, a large quantity of users may simultaneously initiate an attach process; then a large quantity of create session request/response (Create Session Request/Response) messages are generated between an SGW and a PGW, or a large quantity of users simultaneously initiate a service request (Service Request) process. Correspondingly, the process triggers a large quantity of modify bearer request (Modify bearer request) messages between a mobility management entity (Mobility Management Entity, MME) and the SGW, and also triggers some signaling between the SGW and the PGW. Then, in this scenario, device overload may be caused, there may be overload of the MME, overload of the SGW, overload of the PGW, or the like. Meanwhile, a problem that device load is unbalanced may also occur; for example, some devices are heavily loaded whereas other devices are lightly loaded.

SUMMARY

Embodiments of the present invention provide an overload control method, a gateway device, a mobility management entity, and a PGW, which can effectively control device overload.

According to a first aspect, an overload control method is provided, including: determining, by a gateway device, first overload indication information, where the first overload indication information is used to indicate an overload control policy; and sending, by the gateway device, the first overload indication information to a mobility management entity, so that the mobility management entity executes the overload control policy according to the first overload indication information.

In a first possible implementation manner, before the determining, by a gateway device, first overload indication information, the method further includes: receiving, by the gateway device, a first control request message sent by the mobility management entity; the determining, by a gateway device, first overload indication information includes: determining, by the gateway device, the first overload indication information according to a load status of the gateway device; and the sending, by the gateway device, the first overload indication information to a mobility management entity includes: sending, by the gateway device, a first control response message to the mobility management entity, where the first control response message carries the first overload indication information.

In a second possible implementation manner, before the determining, by a gateway device, first overload indication information, the method further includes: receiving, by the gateway device, a first path detection request message sent by the mobility management entity; the determining, by a gateway device, first overload indication information includes: determining, by the gateway device, the first overload indication information according to a load status of the gateway device; and the sending, by the gateway device, the first overload indication information to a mobility management entity includes: sending, by the gateway device, a first path detection response message to the mobility management entity, where the first path detection response message carries the first overload indication information.

With reference to the first or the second possible implementation manner of the first aspect, in a third possible implementation manner, the determining, by the gateway device, the first overload indication information according to a load status of the gateway device includes: determining, by the gateway device, the first overload indication information according to the load status of the gateway device and signaling sending statuses of mobility management entities connected to the gateway device.

In a fourth possible implementation manner, the gateway device is an SGW; before the determining, by a gateway device, first overload indication information, the method further includes: receiving, by the SGW, a first control request message sent by the mobility management entity; sending, by the SGW, a second control request message to a packet data network gateway PGW; and receiving, by the SGW, a second control response message sent by the PGW, where the second control response message carries second overload indication information that is determined by the PGW and used to indicate the overload control policy; the determining, by a gateway device, first overload indication information includes: determining, by the SGW, the second overload indication information as the first overload indication information, or determining, by the SGW, the first overload indication information according to the second overload indication information and signaling sending statuses of mobility management entities connected to the SGW; and the sending, by the gateway device, the first overload indication information to a mobility management entity includes: sending, by the SGW, a first control response message to the mobility management entity, where the first control response message carries the first overload indication information.

In a fifth possible implementation manner, the gateway device is an SGW; before the determining, by a gateway device, first overload indication information, the method further includes: sending, by the SGW, a second path detection request message to a PGW; and receiving, by the SGW, a second path detection response message sent by the PGW, where the second path detection response message carries second overload indication information that is determined by the PGW and used to indicate the overload control policy; the determining, by a gateway device, first overload indication information includes: determining, by the SGW, the second overload indication information as the first overload indication information, or determining, by the SGW, the first overload indication information according to the second overload indication information and signaling sending statuses of mobility management entities connected to the SGW; and the sending, by the gateway device, the first overload indication information to a mobility management entity includes: sending, by the SGW, a first path detection message to the mobility management entity, where the first path detection message carries the first overload indication information.

With reference to the first aspect or any possible implementation manner of the first to the fifth possible implementation manners of the first aspect, in a sixth possible implementation manner, the method further includes: sending, by the gateway device, information about a delay timer to the mobility management entity, so that the mobility management entity executes the overload control policy according to the first overload indication information before the delay timer expires.

With reference to the first aspect or any possible implementation manner of the first to the sixth possible implementation manners of the first aspect, in a seventh possible implementation manner, the overload control policy includes: limiting a quantity of initial access users, delaying signaling in a mobility management process, delaying signaling in a service request process, or delaying signaling in a session management process.

With reference to the first aspect or any possible implementation manner of the first to the seventh possible implementation manners of the first aspect, in an eighth possible implementation manner, the first overload indication information includes an indication or overload status information associated with the overload control policy.

With reference to the eighth possible implementation manner of the first aspect, in a ninth possible implementation manner, the first overload indication information further includes an overload control rate.

In a tenth possible implementation manner, before the determining, by a gateway device, first overload indication information, the method further includes: receiving, by the gateway device, a first control signaling message that is sent by the mobility management entity; and the determining, by a gateway device, first overload indication information includes: determining, by the gateway device, the first overload indication information as a first control signaling response message that includes information about a delay timer, where the first overload indication information indicates that the overload control policy is controlling a signaling process that has a same type as first control signaling.

With reference to the tenth possible implementation manner of the first aspect, in an eleventh possible implementation manner, the determining, by the gateway device, the first overload indication information as a first control signaling response message that includes information about a delay timer includes: determining, by the gateway device, the first overload indication information as the first control signaling response message that includes the information about the delay timer, and an overload control rate.

According to a second aspect, an overload control method is provided, including: receiving, by a mobility management entity, first overload indication information sent by a gateway device, where the first overload indication information is used to indicate an overload control policy; and executing, by the mobility management entity, the overload control policy according to the first overload indication information.

In a first possible implementation manner, before the receiving, by a mobility management entity, first overload indication information sent by a gateway device, the method further includes: sending, by the mobility management entity, a first control request message to the gateway device; and the receiving, by a mobility management entity, first overload indication information sent by a gateway device includes: receiving, by the mobility management entity, a first control response message sent by the gateway device, where the first control response message carries the first overload indication information, and the first overload indication information is determined by the gateway device according to a load status of the gateway device, or the first overload indication information is determined by the gateway device according to a load status of the gateway device and signaling sending statuses of mobility management entities connected to the gateway device.

In a second possible implementation manner, before the receiving, by a mobility management entity, first overload indication information sent by a gateway device, the method further includes: sending, by the mobility management entity, a first path detection request message to the gateway device; and the receiving, by a mobility management entity, first overload indication information sent by a gateway device includes: receiving, by the mobility management entity, a first path detection response message sent by the gateway device, where the first path detection response message carries the first overload indication information, and the first overload indication information is determined by the gateway device according to a load status of the gateway device, or the first overload indication information is determined by the gateway device according to a load status of the gateway device and signaling sending statuses of mobility management entities connected to the gateway device.

In a third possible implementation manner, the gateway device is an SGW; before the receiving, by a mobility management entity, first overload indication information sent by a gateway device, the method further includes: sending, by the mobility management entity, a first control request message to the SGW, so that the SGW sends a second control request message to a packet data network gateway PGW and receives a second control response message sent by the PGW, where the second control response message carries second overload indication information that is determined by the PGW and used to indicate the overload control policy; and the receiving, by a mobility management entity, first overload indication information sent by a gateway device includes: receiving, by the mobility management entity, a first control response message sent by the SGW, where the first control response message carries the first overload indication information, and the first overload indication information is the second overload indication information forwarded by the SGW, or the first overload indication information is determined by the SGW according to the second overload indication information and signaling sending statuses of mobility management entities connected to the SGW.

In a fourth possible implementation manner, the gateway device is an SGW; and the receiving, by a mobility management entity, first overload indication information sent by a gateway device includes: receiving, by the mobility management entity, a first path detection message sent by the SGW, where the first path detection message carries the first overload indication information, and the first overload indication information is second overload indication information that is forwarded by the SGW, determined by a PGW, and used to indicate the overload control policy, or the first overload indication information is determined by the SGW according to the second overload indication information and signaling sending statuses of mobility management entities connected to the SGW.

With reference to the second aspect or any possible implementation manner of the first to the fourth possible implementation manners of the second aspect, in a fifth possible implementation manner, the method further includes: receiving, by the mobility management entity, information about a delay timer sent by the gateway device; and the executing, by the mobility management entity, the overload control policy according to the first overload indication information includes: executing, by the mobility management entity, the overload control policy according to the first overload indication information before the delay timer expires.

With reference to the second aspect or any possible implementation manner of the first to the fifth possible implementation manners of the second aspect, in a sixth possible implementation manner, the overload control policy includes: limiting a quantity of initial access users, delaying signaling in a mobility management process, delaying signaling in a service request process, or delaying signaling in a session management process.

With reference to the second aspect or any possible implementation manner of the first to the sixth possible implementation manners of the second aspect, in a seventh possible implementation manner, the first overload indication information includes an indication or overload status information associated with the overload control policy; and the executing, by the mobility management entity, the overload control policy according to the first overload indication information includes: executing, by the mobility management entity, the overload control policy associated with the indication or the overload status information.

With reference to the seventh possible implementation manner of the second aspect, in an eighth possible implementation manner, the first overload indication information further includes an overload control rate; and the executing, by the mobility management entity, the overload control policy according to the first overload indication information includes: executing, by the mobility management entity according to the overload control rate, the overload control policy associated with the indication or the overload status information.

In a ninth possible implementation manner, before the receiving, by a mobility management entity, first overload indication information sent by a gateway device, the method further includes: sending, by the mobility management entity, a first control signaling message to the gateway device; the receiving, by a mobility management entity, first overload indication information sent by a gateway device includes: receiving, by the mobility management entity, a first control signaling response message that is sent by the gateway device and includes information about a delay timer, where the first control signaling response message indicates that the overload control policy is controlling a signaling process that has a same type as first control signaling; and the executing, by the mobility management entity, the overload control policy according to the first overload indication information includes: controlling, by the mobility management entity according to the first control signaling response message, the signaling process that has the same type as the first control signaling.

With reference to the ninth possible implementation manner of the second aspect, in a tenth possible implementation manner, the first control signaling response message further includes an overload control rate; and the executing, by the mobility management entity, the overload control policy according to the first overload indication information includes: controlling, by the mobility management entity according to the overload control rate, the signaling process that has the same type as the first control signaling.

According to a third aspect, an overload control method is provided, including: determining, by a packet data network gateway PGW, second overload indication information, where the second overload indication information is used to indicate an overload control policy; and sending, by the PGW, the second overload indication information to a serving gateway SGW, so that the SGW performs overload control according to the second overload indication information.

In a first possible implementation manner, the second overload indication information is used to enable the SGW to determine, according to the second overload indication information, first overload indication information that is to be sent to a mobility management entity and used to indicate the overload control policy; or the second overload indication information is used to enable the SGW to execute the overload control policy according to the second overload indication information.

With reference to the third aspect or the first possible implementation manner of the third aspect, in a second possible implementation manner, before the determining, by a PGW, second overload indication information, the method further includes: receiving, by the PGW, a second control request message sent by the SGW; the determining, by a PGW, second overload indication information includes: determining, by the PGW, the second overload indication information according to a load status of the PGW; and the sending, by the PGW, the second overload indication information to a serving gateway SGW includes: sending, by the PGW, a second control response message to the SGW, where the second control response message carries the second overload indication information.

With reference to the third aspect or the first possible implementation manner of the third aspect, in a third possible implementation manner, before the determining, by a PGW, second overload indication information, the method further includes: receiving, by the PGW, a second path detection request message sent by the SGW; the determining, by a PGW, second overload indication information includes: determining, by the PGW, the second overload indication information according to a load status of the PGW; and the sending, by the PGW, the second overload indication information to a serving gateway SGW includes: sending, by the PGW, a second path detection response message to the SGW, where the second path detection response message carries the second overload indication information.

With reference to the second or the third possible implementation manner of the third aspect, in a fourth possible implementation manner, the determining, by the PGW, the second overload indication information according to a load status of the PGW includes: determining, by the PGW, the second overload indication information according to the load status of the PGW and signaling sending statuses of SGWs connected to the PGW.

With reference to the third aspect or any possible implementation manner of the first to the fourth possible implementation manners of the third aspect, in a fifth possible implementation manner, the method further includes: sending, by the PGW, information about a delay timer to the SGW.

With reference to the third aspect or any possible implementation manner of the first to the fifth possible implementation manners of the third aspect, in a sixth possible implementation manner, the overload control policy includes: limiting a quantity of initial access users, delaying signaling in a mobility management process, delaying signaling in a service request process, or delaying signaling in a session management process.

With reference to the third aspect or any possible implementation manner of the first to the sixth possible implementation manners of the third aspect, in a seventh possible implementation manner, the second overload indication information includes an indication or overload status information associated with the overload control policy.

With reference to the seventh possible implementation manner of the third aspect, in an eighth possible implementation manner, the second overload indication information further includes an overload control rate.

With reference to the third aspect or the first possible implementation manner of the third aspect, in a ninth possible implementation manner, before the determining, by a PGW, second overload indication information, the method further includes: receiving, by the PGW, a second control signaling message that is sent by the SGW; and the determining, by a PGW, second overload indication information includes: determining, by the PGW, the second overload indication information as a second control signaling response message that includes information about a delay timer, where the second overload indication information indicates that the overload control policy is controlling a signaling process that has a same type as the second control signaling.

With reference to the ninth possible implementation manner of the third aspect, in a tenth possible implementation manner, the determining, by the PGW, the second overload indication information as a second control signaling response message that includes information about a delay timer includes: determining, by the PGW, the second overload indication information as the second control signaling response message that includes the information about the delay timer, and an overload control rate.

According to a fourth aspect, a gateway device is provided, including: a determining module, configured to determine first overload indication information, where the first overload indication information is used to indicate an overload control policy; and a sending module, configured to send the first overload indication information to a mobility management entity, so that the mobility management entity executes the overload control policy according to the first overload indication information.

In a first possible implementation manner, the gateway device further includes a first receiving module, configured to: before the determining module determines the first overload indication information, receive a first control request message sent by the mobility management entity; where the determining module is specifically configured to determine the first overload indication information according to a load status of the gateway device; and the sending module is specifically configured to send a first control response message to the mobility management entity, where the first control response message carries the first overload indication information.

In a second possible implementation manner, the gateway device further includes a second receiving module, configured to: before the determining module determines the first overload indication information, receive a first path detection request message sent by the mobility management entity; where the determining module is specifically configured to determine the first overload indication information according to a load status of the gateway device; and the sending module is specifically configured to send a first path detection response message to the mobility management entity, where the first path detection response message carries the first overload indication information.

With reference to the first or the second possible implementation manner of the fourth aspect, in a third possible implementation manner, the determining module is specifically configured to determine the first overload indication information according to the load status of the gateway device and signaling sending statuses of mobility management entities connected to the gateway device.

In a fourth possible implementation manner, the gateway device is an SGW; the gateway device further includes a third receiving module, configured to: before the determining module determines the first overload indication information, receive a first control request message sent by the mobility management entity; where the sending module is further configured to send a second control request message to a packet data network gateway PGW; the third receiving module is further configured to receive a second control response message sent by the PGW, where the second control response message carries second overload indication information that is determined by the PGW and used to indicate the overload control policy; the determining module is specifically configured to: determine the second overload indication information as the first overload indication information, or determine the first overload indication information according to the second overload indication information and signaling sending statuses of mobility management entities connected to the SGW; and the sending module is specifically configured to send a first control response message to the mobility management entity, where the first control response message carries the first overload indication information.

In a fifth possible implementation manner, the gateway device is an SGW; the sending module is further configured to: before the determining module determines the first overload indication information, send a second path detection request message to a PGW; and the gateway device further includes a fourth receiving module, configured to receive a second path detection response message sent by the PGW, where the second path detection response message carries second overload indication information that is determined by the PGW and used to indicate the overload control policy; where the determining module is specifically configured to: determine the second overload indication information as the first overload indication information, or determine the first overload indication information according to the second overload indication information and signaling sending statuses of mobility management entities connected to the SGW; and the sending module is specifically configured to send a first path detection message to the mobility management entity, where the first path detection message carries the first overload indication information.

With reference to the third aspect or any possible implementation manner of the first to the fifth possible implementation manners of the third aspect, in a sixth possible implementation manner, the sending module is further configured to send information about a delay timer to the mobility management entity, so that the mobility management entity executes the overload control policy according to the first overload indication information before the delay timer expires.

With reference to the third aspect or any possible implementation manner of the first to the sixth possible implementation manners of the third aspect, in a seventh possible implementation manner, the overload control policy includes: limiting a quantity of initial access users, delaying signaling in a mobility management process, delaying signaling in a service request process, or delaying signaling in a session management process.

With reference to the third aspect or any possible implementation manner of the first to the seventh possible implementation manners of the third aspect, in an eighth possible implementation manner, the first overload indication information includes an indication or overload status information associated with the overload control policy.

With reference to the eighth possible implementation manner of the third aspect, in a ninth possible implementation manner, the first overload indication information further includes an overload control rate.

In a tenth possible implementation manner, the gateway device further includes a fifth receiving module, configured to: before the determining module determines the first overload indication information, receive a first control signaling message that is sent by the mobility management entity; where the determining module is specifically configured to determine the first overload indication information as a first control signaling response message that includes information about a delay timer, where the first overload indication information indicates that the overload control policy is controlling a signaling process that has a same type as first control signaling.

With reference to the tenth possible implementation manner of the third aspect, in an eleventh possible implementation manner, the determining module is specifically configured to determine the first overload indication information as the first control signaling response message that includes the information about the delay timer, and an overload control rate.

According to a fifth aspect, a mobility management entity is provided, including: a receiving module, configured to receive first overload indication information sent by a gateway device, where the first overload indication information is used to indicate an overload control policy; and a processing module, configured to execute the overload control policy according to the first overload indication information.

In a first possible implementation manner, the mobility management entity further includes a first sending module, configured to: before the receiving module receives the first overload indication information sent by the gateway device, send a first control request message to the gateway device; where the receiving module is specifically configured to receive a first control response message sent by the gateway device, where the first control response message carries the first overload indication information, and the first overload indication information is determined by the gateway device according to a load status of the gateway device, or the first overload indication information is determined by the gateway device according to a load status of the gateway device and signaling sending statuses of mobility management entities connected to the gateway device.

In a second possible implementation manner, the mobility management entity further includes a second sending module, configured to: before the receiving module receives the first overload indication information sent by the gateway device, send a first path detection request message to the gateway device; where the receiving module is specifically configured to receive a first path detection response message sent by the gateway device, where the first path detection response message carries the first overload indication information, and the first overload indication information is determined by the gateway device according to a load status of the gateway device, or the first overload indication information is determined by the gateway device according to a load status of the gateway device and signaling sending statuses of mobility management entities connected to the gateway device.

In a third possible implementation manner, the gateway device is an SGW; and the mobility management entity further includes a third sending module, configured to: before the receiving module receives the first overload indication information sent by the gateway device, send a first control request message to the SGW, so that the SGW sends a second control request message to a packet data network gateway PGW and receives a second control response message sent by the PGW, where the second control response message carries second overload indication information that is determined by the PGW and used to indicate the overload control policy; where the receiving module is specifically configured to receive a first control response message sent by the SGW, where the first control response message carries the first overload indication information, and the first overload indication information is the second overload indication information forwarded by the SGW, or the first overload indication information is determined by the SGW according to the second overload indication information and signaling sending statuses of mobility management entities connected to the SGW.

In a fourth possible implementation manner, the gateway device is an SGW; and the receiving module is specifically configured to receive a first path detection message sent by the SGW, where the first path detection message carries the first overload indication information, and the first overload indication information is second overload indication information that is forwarded by the SGW, determined by a PGW, and used to indicate the overload control policy, or the first overload indication information is determined by the SGW according to the second overload indication information and signaling sending statuses of mobility management entities connected to the SGW.

With reference to the fifth aspect or any possible implementation manner of the first to the fourth possible implementation manners of the fifth aspect, in a fifth possible implementation manner, the receiving module is further configured to receive information about a delay timer sent by the gateway device; and the processing module is specifically configured to execute the overload control policy according to the first overload indication information before the delay timer expires.

With reference to the fifth aspect or any possible implementation manner of the first to the fifth possible implementation manners of the fifth aspect, in a sixth possible implementation manner, the overload control policy includes: limiting a quantity of initial access users, delaying signaling in a mobility management process, delaying signaling in a service request process, or delaying signaling in a session management process.

With reference to the fifth aspect or any possible implementation manner of the first to the sixth possible implementation manners of the fifth aspect, in a seventh possible implementation manner, the first overload indication information includes an indication or overload status information associated with the overload control policy; and the processing module is specifically configured to execute the overload control policy associated with the indication or the overload status information.

With reference to the seventh possible implementation manner of the fifth aspect, in an eighth possible implementation manner, the first overload indication information further includes an overload control rate; and the processing module is specifically configured to execute, according to the overload control rate, the overload control policy associated with the indication or the overload status information.

In a ninth possible implementation manner, the mobility management entity further includes a fourth sending module, configured to: before the receiving module receives the first overload indication information sent by the gateway device, send a first control signaling message to the gateway device; where the receiving module is specifically configured to receive a first control signaling response message that is sent by the gateway device and includes information about a delay timer, where the first control signaling response message indicates that the overload control policy is controlling a signaling process that has a same type as first control signaling; and the processing module is specifically configured to control, according to the first control signaling response message, the signaling process that has the same type as the first control signaling.

With reference to the ninth possible implementation manner of the fifth aspect, in a tenth possible implementation manner, the first control signaling response message further includes an overload control rate; and the processing module is specifically configured to control, according to the overload control rate, the signaling process that has the same type as the first control signaling.

According to a sixth aspect, a PGW is provided, including: a determining module, configured to determine second overload indication information, where the second overload indication information is used to indicate an overload control policy; and a sending module, configured to send the second overload indication information to a serving gateway SGW, so that the SGW performs overload control according to the second overload indication information.

In a first possible implementation manner, the second overload indication information is used to enable the SGW to determine, according to the second overload indication information, first overload indication information that is to be sent to a mobility management entity and used to indicate the overload control policy; or the second overload indication information is used to enable the SGW to execute the overload control policy according to the second overload indication information.

With reference to the sixth aspect or the first possible implementation manner of the sixth aspect, in a second possible implementation manner, the PGW further includes a first receiving module, configured to: before the determining module determines the second overload indication information, receive a second control request message sent by the SGW; where the determining module is specifically configured to determine the second overload indication information according to a load status of the PGW; and the sending module is specifically configured to send a second control response message to the SGW, where the second control response message carries the second overload indication information.

With reference to the sixth aspect or the first possible implementation manner of the sixth aspect, in a third possible implementation manner, the PGW further includes a second receiving module, configured to: before the determining module determines the second overload indication information, receive a second path detection request message sent by the SGW; where the determining module is specifically configured to determine the second overload indication information according to a load status of the PGW; and the sending module is specifically configured to send a second path detection response message to the SGW, where the second path detection response message carries the second overload indication information.

With reference to the second or the third possible implementation manner of the sixth aspect, in a fourth possible implementation manner, the determining module is specifically configured to determine the second overload indication information according to the load status of the PGW and signaling sending statuses of SGWs connected to the PGW.

With reference to the sixth aspect or any possible implementation manners of the first to the fourth possible implementation manners of the sixth aspect, in a fifth possible implementation manner, the sending module is further configured to send information about a delay timer to the SGW.

With reference to the sixth aspect or any possible implementation manner of the first to the fifth possible implementation manners of the sixth aspect, in a sixth possible implementation manner, the overload control policy includes: limiting a quantity of initial access users, delaying signaling in a mobility management process, delaying signaling in a service request process, or delaying signaling in a session management process.

With reference to the sixth aspect or any possible implementation manner of the first to the sixth possible implementation manners of the sixth aspect, in a seventh possible implementation manner, the second overload indication information includes an indication or overload status information associated with the overload control policy.

With reference to the seventh possible implementation manner of the sixth aspect, in an eighth possible implementation manner, the second overload indication information further includes an overload control rate.

With reference to the sixth aspect or the first possible implementation manner of the sixth aspect, in a ninth possible implementation manner, the PGW further includes a third receiving module, configured to: before the determining module determines the second overload indication information, receive a second control signaling message that is sent by the SGW; where the determining module is specifically configured to determine the second overload indication information as a second control signaling response message that includes information about a delay timer, where the second overload indication information indicates that the overload control policy is controlling a signaling process that has a same type as the second control signaling.

With reference to the ninth possible implementation manner of the sixth aspect, in a tenth possible implementation manner, the determining module is specifically configured to determine the second overload indication information as the second control signaling response message that includes the information about the delay timer, and an overload control rate.

Based on the foregoing technical solutions, in the embodiments of the present invention, overload indication information used to indicate an overload control policy is sent to a mobility management entity, so that the mobility management entity executes the overload control policy, which can avoid adverse impact brought by device overload; therefore, the device overload can be effectively controlled.

BRIEF DESCRIPTION OF DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 11 is still another schematic flowchart of an overload control method according to another embodiment of the present invention;

DESCRIPTION OF EMBODIMENTS

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

It should be understood that, the technical solutions of the embodiments of the present invention may be applied to various communications systems, such as: a Global System for Mobile Communications (Global System of Mobile communication, GSM) system, a Code Division Multiple Access (Code Division Multiple Access, CDMA) system, a Wideband Code Division Multiple Access (Wideband Code Division Multiple Access, WCDMA) system, a general packet radio service (General Packet Radio Service, GPRS), a Long Term Evolution (Long Term Evolution, LTE) system, an LTE frequency division duplex (Frequency Division Duplex, FDD) system, an LTE time division duplex (Time Division Duplex, TDD), a Universal Mobile Telecommunications System (Universal Mobile Telecommunication System, UMTS), and a Worldwide Interoperability for Microwave Access (Worldwide Interoperability for Microwave Access, WiMAX) communications system.

In the embodiments of the present invention, a gateway device may be a gateway GPRS support node (Gateway GPRS Support Node, GGSN) in the GSM or the UMTS, or may be an SGW in the LTE, which is not limited in the present invention.

In the embodiments of the present invention, a mobility management entity may be a serving GPRS support node (Serving GPRS Support Node, SGSN) in the GSM or the UMTS, or may be an MME in the LTE, which is not limited in the present invention.

Figure 1:
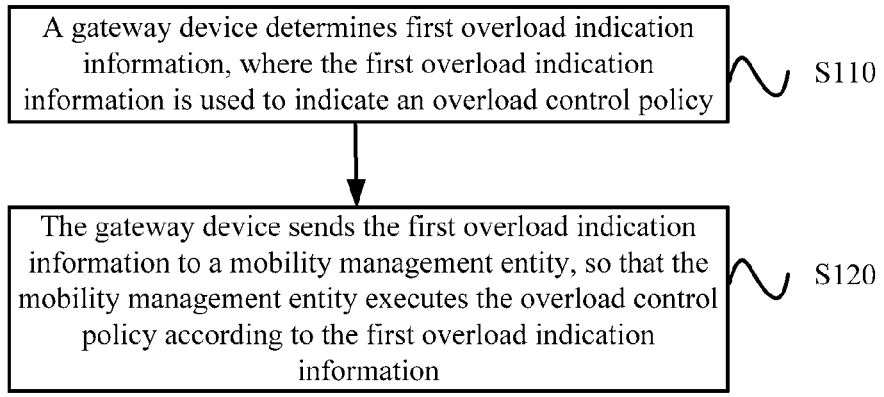
FIG. 1 is a schematic flowchart of an overload control method according to an embodiment of the present invention.

FIG. 1 shows a schematic flowchart of an overload control method 100 according to an embodiment of the present invention. As shown in FIG. 1, the method 100 includes:

S110. A gateway device determines first overload indication information, where the first overload indication information is used to indicate an overload control policy.

S120. The gateway device sends the first overload indication information to a mobility management entity, so that the mobility management entity executes the overload control policy according to the first overload indication information.

In this embodiment of the present invention, when overload control needs to be performed on a gateway device, that is, when the gateway device is in an overloaded state, first overload indication information used to indicate an overload control policy is send to a mobility management entity, and the mobility management entity executes the overload control policy according to the first overload indication information, thereby reducing load of the gateway device, and avoiding adverse impact brought by overload of the gateway device.

Therefore, according to the overload control method in this embodiment of the present invention, overload indication information used to indicate an overload control policy is sent to a mobility management entity, so that the mobility management entity executes the overload control policy, which can avoid adverse impact brought by device overload; therefore, the device overload can be effectively controlled.

It should be understood that in this embodiment of the present invention, the terms "first" and "second" are merely intended to distinguish different information or content, and are not intended to impose other limitations on this embodiment of the present invention.

In this embodiment of the present invention, the overload control policy is a policy that is set to reduce device load. For example, the overload control policy includes: limiting a quantity of initial access users, delaying signaling in a mobility management process, delaying signaling in a service request process, or delaying signaling in a session management process. Limiting a quantity of initial access users may enable users to search for another lightly overloaded gateway device. A subscription event that brings more signaling, for example, cell location reporting, may be delayed. However, this embodiment of the present invention imposes no limitation on the overload control policy, and the overload control policy may be another policy that may reduce device load. Optionally, all overload control policies may be configured in advance, and may further be updated continuously.

In this embodiment of the present invention, overload indication information is used to indicate an overload control policy. This embodiment of the present invention imposes no limitation on a specific form of the overload indication information. Optionally, the first overload indication information may be an indication associated with an overload control policy, that is, different indication values are used to indicate different overload control policies. For example, 1, 2, or 3 is used to respectively indicate a first, a second, or a third overload control policy.

Optionally, the first overload indication information may be overload status information associated with an overload control policy, that is, different overload status information is used to indicate different overload control policies. For example, "light", "medium", or "heavy" is used to respectively indicate a first, a second, or a third overload control policy.

Optionally, the first overload indication information further includes an overload control rate. For example, "a %" indicate reducing a quantity of initial access users by a %.

After receiving the overload indication information, the mobility management entity executes the overload control policy according to the overload indication information to perform overload control. A time for performing overload control may be determined by the mobility management entity, or may be configured in advance, that is, upon receiving the overload indication information, the mobility management entity starts to perform overload control within the time configured in advance. This embodiment of the present invention imposes no limitation on a manner of determining the time for performing overload control.

In this embodiment of the present invention, the overload indication information may be carried in different messages, for example, a control message or a path detection message between the mobility management entity and the gateway device, and sent.

Figure 2:
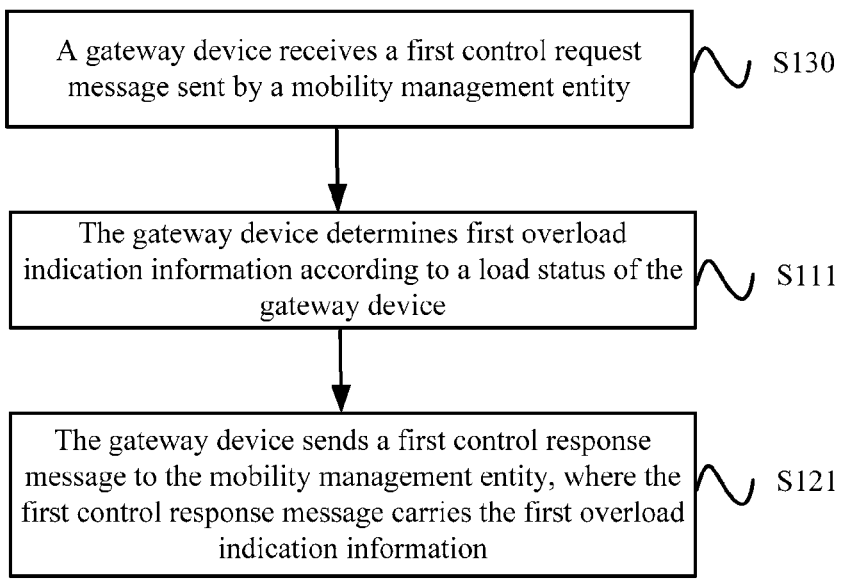
FIG. 2 is another schematic flowchart of an overload control method according to an embodiment of the present invention.

In this embodiment of the present invention, as shown in FIG. 2, optionally, before S110, the method 100 further includes:

S130. The gateway device receives a first control request message sent by the mobility management entity.

S110 includes:

S111. The gateway device determines the first overload indication information according to a load status of the gateway device.

S120 includes:

S121. The gateway device sends a first control response message to the mobility management entity, where the first control response message carries the first overload indication information.

Specifically, in this embodiment, the overload indication information is sent by using a control message. The mobility management entity sends, to the gateway device, the first control request message, for example, a create session request message. The gateway device determines the first overload indication information according to the load status of the gateway device, and includes the first overload indication information in the first control response message that is to be sent to the mobility management entity, so as to indicate the overload control policy. After receiving the first control response message, the mobility management entity executes the overload control policy according to the first overload indication information carried in the first control response message, so as to perform control on overload of the gateway device.

Optionally, S111 includes: determining, by the gateway device, the first overload indication information according to the load status of the gateway device and signaling sending statuses of mobility management entities connected to the gateway device.

Specifically, when the gateway device is connected to multiple mobility management entities, differentiated processing may be performed on different mobility management entities. The gateway device determines overload indication information for mobility management entities according to the load status of the gateway device and signaling sending statuses of the mobility management entities, for example, information such as a quantity of signaling and/or frequency of sending signaling, so as to instruct the mobility management entities to execute different overload control policies. For example, for a mobility management entity that sends a large quantity of signaling, a tighter overload control policy is executed, and for a mobility management entity that sends a small quantity of signaling, a looser overload control policy may be executed. By performing differentiated processing on different mobility management entities, a situation in which load of the gateway device is either high or low that is caused by overload control simultaneously initiated by all mobility management entities can be avoided; therefore, device load balancing can be implemented.

Figure 3:
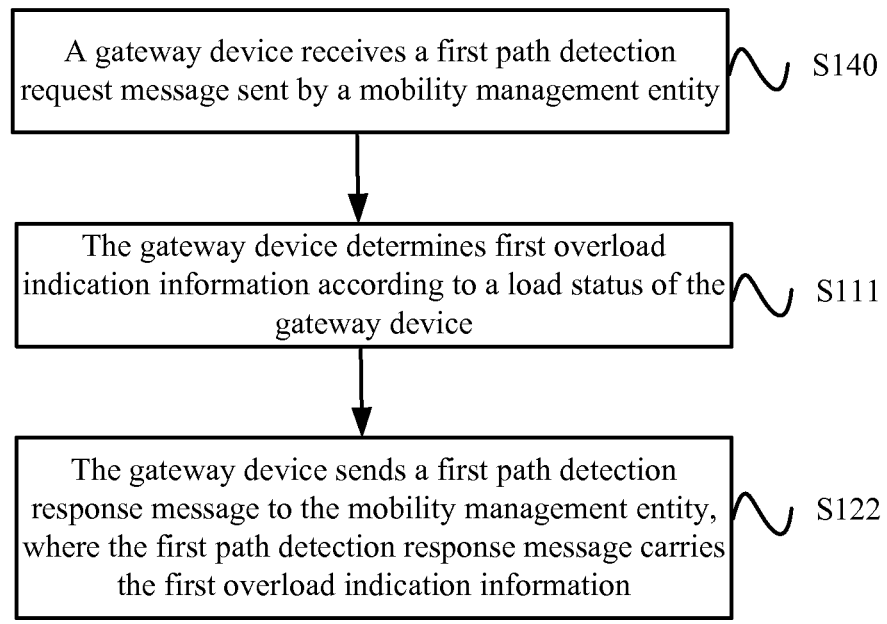
FIG. 3 is still another schematic flowchart of an overload control method according to an embodiment of the present invention.

In this embodiment of the present invention, as shown in FIG. 3, optionally, before S110, the method 100 further includes:

S140. The gateway device receives a first path detection request message sent by the mobility management entity.

S110 includes:

S111. The gateway device determines the first overload indication information according to a load status of the gateway device.

S120 includes:

S122. The gateway device sends a first path detection response message to the mobility management entity, where the first path detection response message carries the first overload indication information.

Specifically, in this embodiment, the overload indication information is sent by using a path detection message. The mobility management entity sends, to the gateway device, the first path detection request message, for example, an echo protocol (Echo Protocol, Echo) request message. The gateway device determines the first overload indication information according to the load status of the gateway device, and includes the first overload indication information in the first path detection response message that is to be sent to the mobility management entity, so as to indicate the overload control policy. After receiving the first path detection response message, the mobility management entity executes the overload control policy according to the first overload indication information carried in the first path detection response message, so as to perform control on overload of the gateway device.

Similar to the foregoing embodiment, S111 includes: determining, by the gateway device, the first overload indication information according to the load status of the gateway device and signaling sending statuses of mobility management entities connected to the gateway device.

For specific description, refer to the foregoing embodiment, and details are not described herein again.

Figure 4:
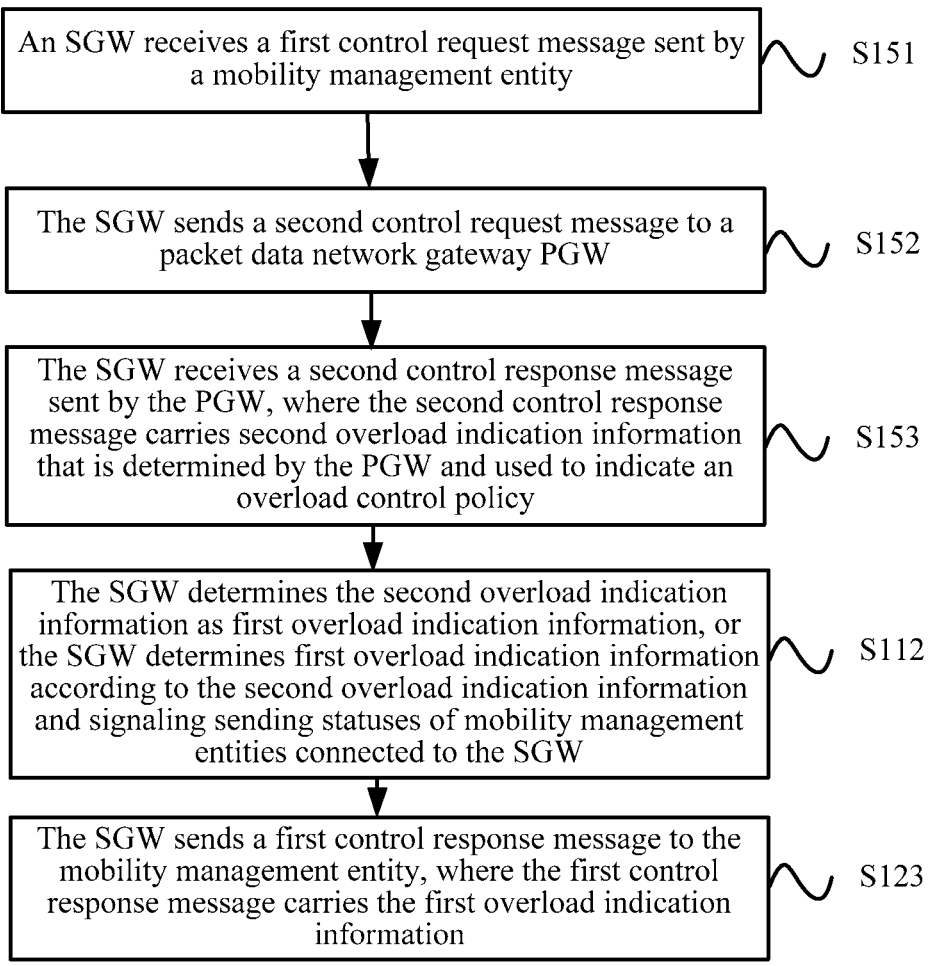
FIG. 4 is still another schematic flowchart of an overload control method according to an embodiment of the present invention.

In this embodiment of the present invention, optionally, the gateway device is an SGW. As shown in FIG. 4, before S110, the method 100 further includes:

S151. The SGW receives a first control request message sent by the mobility management entity.

S152. The SGW sends a second control request message to a packet data network gateway PGW.

S153. The SGW receives a second control response message sent by the PGW, where the second control response message carries second overload indication information that is determined by the PGW and used to indicate the overload control policy.

S110 includes:

S112. The SGW determines the second overload indication information as the first overload indication information, or the SGW determines the first overload indication information according to the second overload indication information and signaling sending statuses of mobility management entities connected to the SGW.

S120 includes:

S123. The SGW sends a first control response message to the mobility management entity, where the first control response message carries the first overload indication information.

Specifically, in an LTE system, when a PGW is overloaded, control on overload of the PGW needs to be performed. In this embodiment, the overload indication information is sent by using a control message. The mobility management entity sends, to the SGW, the first control request message, for example, a create session request message. The SGW sends the second control request message to the PGW. The PGW determines the second overload indication information used to indicate the overload control policy. Optionally, the PGW determines the second overload indication information according to a load status of the PGW, or the PGW determines the second overload indication information according to a load status of the PGW and signaling sending statuses of SGWs connected to the PGW. The PGW includes the second overload indication information in the second control response message that is to be sent to the SGW, so as to indicate the overload control policy. The SGW uses the second overload indication information as the first overload indication information that is to be sent to the mobility management entity (that is, forwards the overload indication information sent by the PGW), or the SGW determines the first overload indication information according to the second overload indication information and the signaling sending statuses of the mobility management entities connected to the SGW. The SGW includes the first overload indication information in the first control response message that is to be sent to the mobility management entity, so as to indicate the overload control policy. After receiving the first control response message, the mobility management entity executes the overload control policy according to the first overload indication information, so as to implement control on overload of the PGW.

Figure 5:
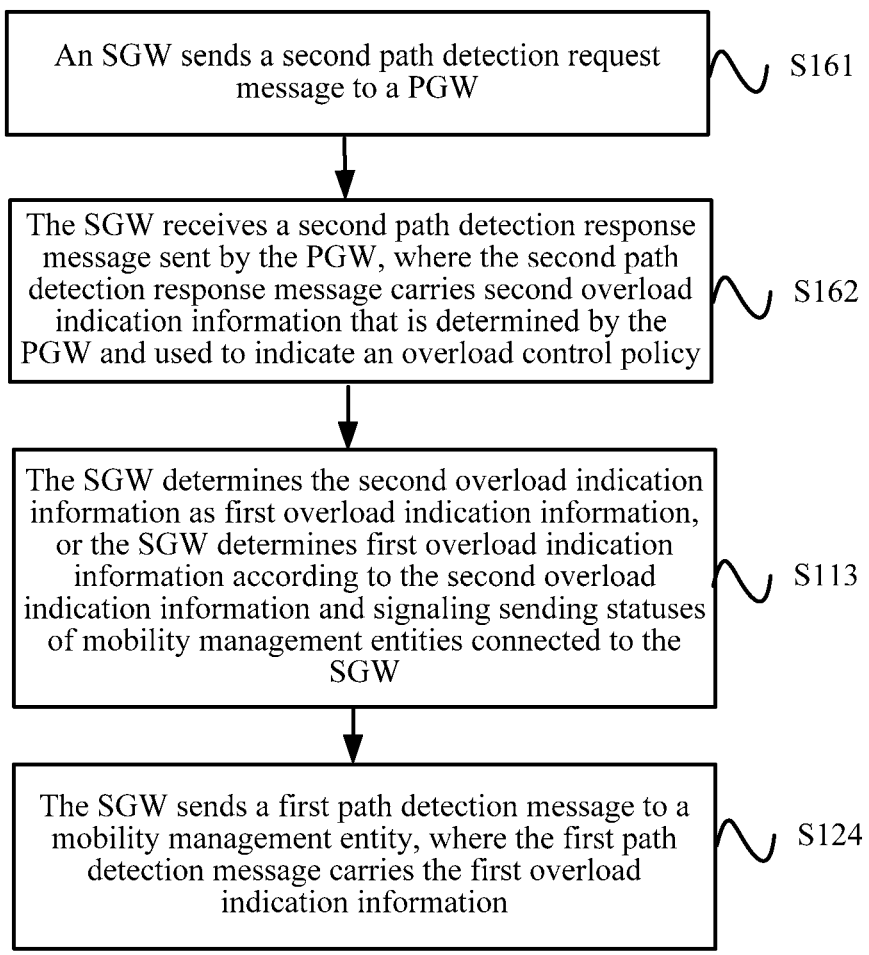
FIG. 5 is still another schematic flowchart of an overload control method according to an embodiment of the present invention.

In this embodiment of the present invention, optionally, the gateway device is an SGW. As shown in FIG. 5, before S110, the method 100 further includes:

S161. The SGW sends a second path detection request message to a PGW.

S162. The SGW receives a second path detection response message sent by the PGW, where the second path detection response message carries second overload indication information that is determined by the PGW and used to indicate the overload control policy.

S110 includes:

S113. The SGW determines the second overload indication information as the first overload indication information, or the SGW determines the first overload indication information according to the second overload indication information and signaling sending statuses of mobility management entities connected to the SGW.

S120 includes:

S124. The SGW sends a first path detection message to the mobility management entity, where the first path detection message carries the first overload indication information.

Specifically, in this embodiment, the overload indication information is sent by using a path detection message. The SGW sends, to the PGW, the second path detection request message, for example, an Echo request message. The PGW determines the second overload indication information used to indicate the overload control policy. Optionally, the PGW determines the second overload indication information according to a load status of the PGW, or the PGW determines the second overload indication information according to a load status of the PGW and signaling sending statuses of SGWs connected to the PGW. The PGW includes the second overload indication information in the second path detection response message that is to be sent to the SGW, so as to indicate the overload control policy. The SGW uses the second overload indication information as the first overload indication information that is to be sent to the mobility management entity (that is, forwards the overload indication information sent by the PGW), or the SGW determines the first overload indication information according to the second overload indication information and the signaling sending statuses of the mobility management entities connected to the SGW. The SGW sends the first overload indication information to the mobility management entity by using the first path detection message (a path detection request message or a path detection response message). For example, after receiving the first path detection request message sent by the mobility management entity to the SGW, the SGW includes the first overload indication information in the first path detection response message that is to be sent to the mobility management entity, or the SGW actively sends a path detection request message to the mobility management entity, where the path detection request message carries the first overload indication information, so as to indicate the overload control policy. After receiving the first path detection message, the mobility management entity executes the overload control policy according to the first overload indication information, so as to implement control on overload of the PGW.

Figure 6:
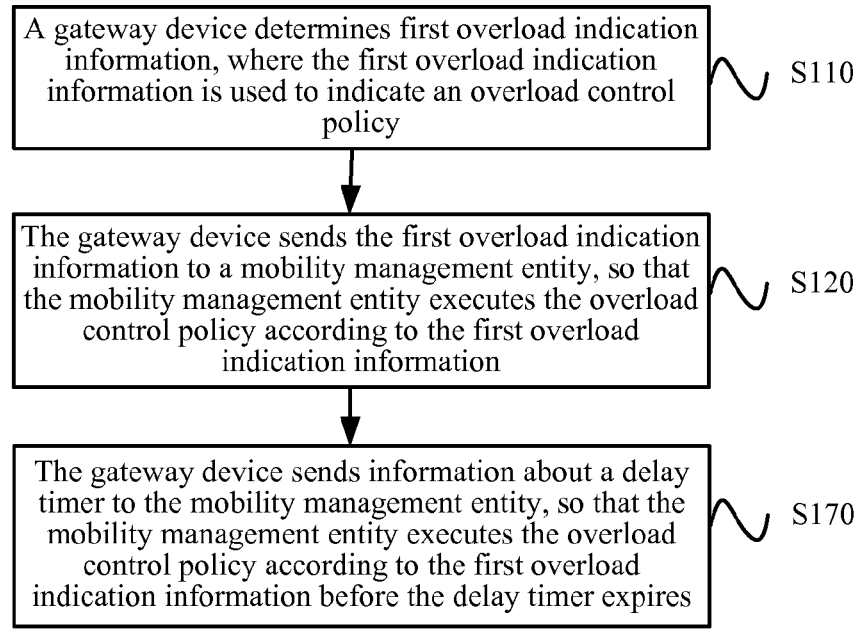
FIG. 6 is still another schematic flowchart of an overload control method according to an embodiment of the present invention.

In this embodiment of the present invention, as shown in FIG. 6, optionally, the method 100 further includes:

S170. The gateway device sends information about a delay timer to the mobility management entity, so that the mobility management entity executes the overload control policy according to the first overload indication information before the delay timer expires.

Specifically, in addition to sending the overload indication information, the gateway device further simultaneously sends the information about the delay timer to the mobility management entity, so as to instruct the mobility management entity to: execute the overload control policy to perform overload control before the delay timer expires and no longer perform overload control after the delay timer expires. In this way, the mobility management entity may be instructed, by using the information about the delay timer, to perform overload control in a particular time, without requiring the mobility management entity to determine a time for performing overload control. Therefore, the gateway device may adjust the time for performing overload control, which can implement overload control more effectively.

Figure 7:
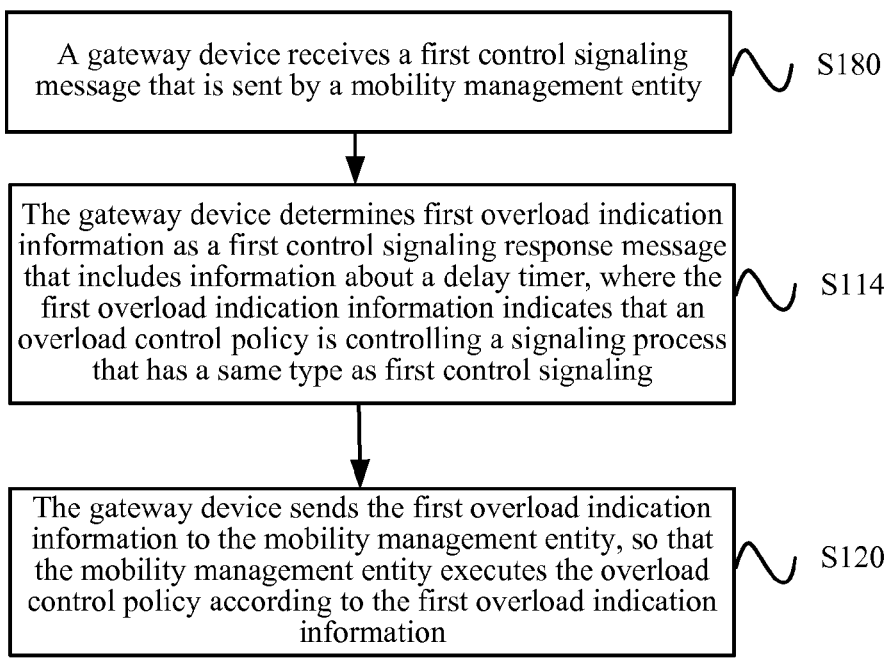
FIG. 7 is still another schematic flowchart of an overload control method according to an embodiment of the present invention.

In this embodiment of the present invention, as shown in FIG. 7, optionally, before S110, the method 100 further includes:

S180. The gateway device receives a first control signaling message that is sent by the mobility management entity.

S110 includes:

S114. The gateway device determines the first overload indication information as a first control signaling response message that includes information about a delay timer, where the first overload indication information indicates that the overload control policy is controlling a signaling process that has a same type as first control signaling.

Specifically, in this embodiment, the first control signaling response message that includes the information about the delay timer, for example, a create session response message is used to instruct to execute the overload control policy of controlling a signaling process that has a same type as the control signaling. That is, the first control signaling response message that includes the information about the delay timer is associated with controlling the signaling process that has the same type as the control signaling. After receiving the first control signaling message that is sent by the mobility management entity, the gateway device instructs, by sending the first control signaling response message that includes the information about the delay timer to the mobility management entity, the mobility management entity to control the signaling process that has the same type as the control signaling before the delay timer expires.

Optionally, S114 includes: determining, by the gateway device, the first overload indication information as the first control signaling response message that includes the information about the delay timer, and an overload control rate.

That is, the first control signaling response message may further include an overload control rate, for example, "a %", which indicates that a rate of controlling the signaling process that has the same type as the control signaling is a %.

It should be understood that the overload indication information may also be carried in another message and sent, or may be sent by using a new message, which is not limited in this embodiment of the present invention.

According to the overload control method in this embodiment of the present invention, overload indication information used to indicate an overload control policy is sent to a mobility management entity, so that the mobility management entity executes the overload control policy according to the overload indication information, which can avoid adverse impact brought by device overload; therefore, the device overload can be effectively controlled.

The foregoing describes in detail the overload control method in the embodiment of the present invention from a perspective of a gateway device with reference to FIG. 1 to FIG. 7. The following describes in detail an overload control method in an embodiment of the present invention from a perspective of a mobility management entity with reference to FIG. 8 to FIG. 14.

Figure 8:
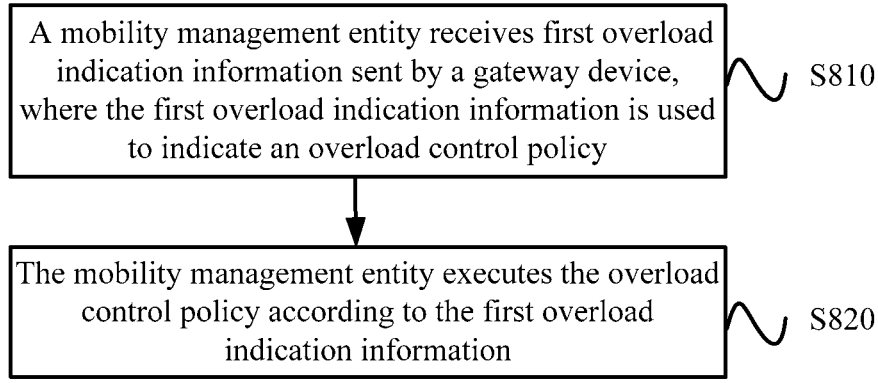
FIG. 8 is a schematic flowchart of an overload control method according to another embodiment of the present invention.

FIG. 8 shows a schematic flowchart of an overload control method 800 according to an embodiment of the present invention. As shown in FIG. 8, the method 800 includes:

S810. A mobility management entity receives first overload indication information sent by a gateway device, where the first overload indication information is used to indicate an overload control policy.

S820. The mobility management entity executes the overload control policy according to the first overload indication information.

In this embodiment of the present invention, when a gateway device is in an overloaded state, the gateway device sends, to a mobility management entity, first overload indication information used to indicate an overload control policy, and after receiving the first overload indication information sent by the gateway device, the mobility management entity executes the overload control policy according to the first overload indication information, thereby reducing load of the gateway device, and avoiding adverse impact brought by overload of the gateway device.

Therefore, according to the overload control method in this embodiment of the present invention, overload indication information that is sent by a gateway device and used to indicate an overload control policy is received, and the overload control policy is executed according to the overload indication information, which can avoid adverse impact brought by device overload; therefore, the device overload can be effectively controlled.

In this embodiment of the present invention, the overload control policy is a policy that is set to reduce device load. For example, the overload control policy includes: limiting a quantity of initial access users, delaying signaling in a mobility management process, delaying signaling in a service request process, or delaying signaling in a session management process. Limiting a quantity of initial access users may enable users to search for another lightly overloaded gateway device. However, this embodiment of the present invention imposes no limitation on the overload control policy, and the overload control policy may be another policy that may reduce device load. Optionally, all overload control policies may be configured in advance, and may further be updated continuously.

In this embodiment of the present invention, overload indication information is used to indicate an overload control policy. This embodiment of the present invention imposes no limitation on a specific form of the overload indication information.

In this embodiment of the present invention, optionally, the first overload indication information includes an indication or overload status information associated with the overload control policy.

S820 includes: executing, by the mobility management entity, the overload control policy associated with the indication or the overload status information.

Specifically, the first overload indication information may be an indication associated with an overload control policy, that is, different indication values are used to indicate different overload control policies. For example, 1, 2, or 3 is used to respectively indicate a first, a second, or a third overload control policy. After receiving the indication, the mobility management entity executes the overload control policy associated with the indication. For example, if the indication received by the mobility management entity is 1, the first overload control policy is executed.

Alternatively, the first overload indication information may be overload status information associated with an overload control policy, that is, different overload status information is used to indicate different overload control policies. For example, "light", "medium", or "heavy" is used to respectively indicate a first, a second, or a third overload control policy. After receiving the overload status information, the mobility management entity executes the overload control policy associated with the overload status information.

Optionally, the first overload indication information further includes an overload control rate.

S820 includes: executing, by the mobility management entity according to the overload control rate, the overload control policy associated with the indication or the overload status information.

That is, in addition to including the indication or the overload status information associated with the overload control policy, the first overload indication information further includes the overload control rate. For example, "a %" indicate reducing a quantity of initial access users by a %. After receiving the indication and the overload control rate, or the overload status information and the overload control rate, the mobility management entity executes, according to the overload control rate, the overload control policy associated with the indication or the overload status information. For example, if the mobility management entity receives "a %", the mobility management entity reduces the a quantity of initial access users by a %.

After receiving the overload indication information, the mobility management entity executes the overload control policy according to the overload indication information to perform overload control. A time for performing overload control may be determined by the mobility management entity, or may be configured in advance, that is, upon receiving the overload indication information, the mobility management entity starts to perform overload control within the time configured in advance. This embodiment of the present invention imposes no limitation on a manner of determining the time for performing overload control.

Figure 9:
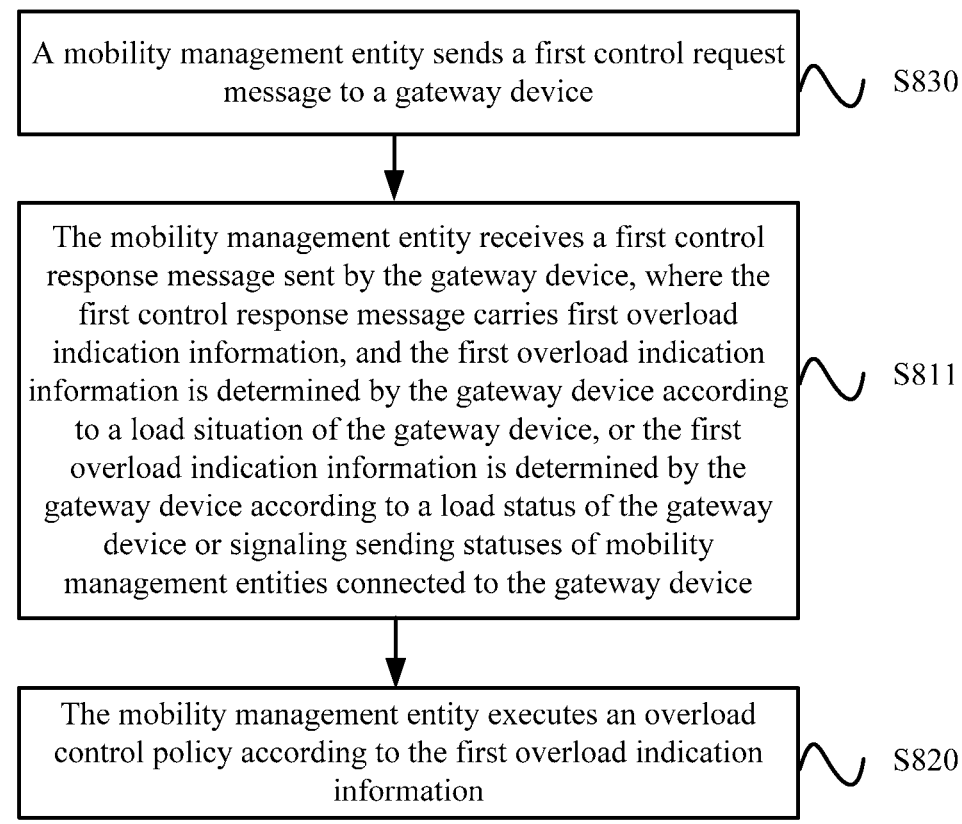
FIG. 9 is another schematic flowchart of an overload control method according to another embodiment of the present invention.

In this embodiment of the present invention, as shown in FIG. 9, optionally, before S810, the method 800 further includes:

S830. The mobility management entity sends a first control request message to the gateway device.

S810 includes:

S811. The mobility management entity receives a first control response message sent by the gateway device, where the first control response message carries the first overload indication information, and the first overload indication information is determined by the gateway device according to a load status of the gateway device, or the first overload indication information is determined by the gateway device according to a load status of the gateway device and signaling sending statuses of mobility management entities connected to the gateway device.

In this embodiment, the overload indication information is sent by using a control message. The mobility management entity sends the first control request message to the gateway device. The gateway device determines the first overload indication information according to the load status of the gateway device, or the gateway device determines the first overload indication information according to the load status of the gateway device and the signaling sending statuses of the mobility management entities connected to the gateway device. The first overload indication information is included in the first control response message that is to be sent to the mobility management entity, so as to indicate the overload control policy. After receiving the first control response message, the mobility management entity executes the overload control policy according to the first overload indication information carried in the first control response message, so as to perform control on overload of the gateway device.

Figure 10:
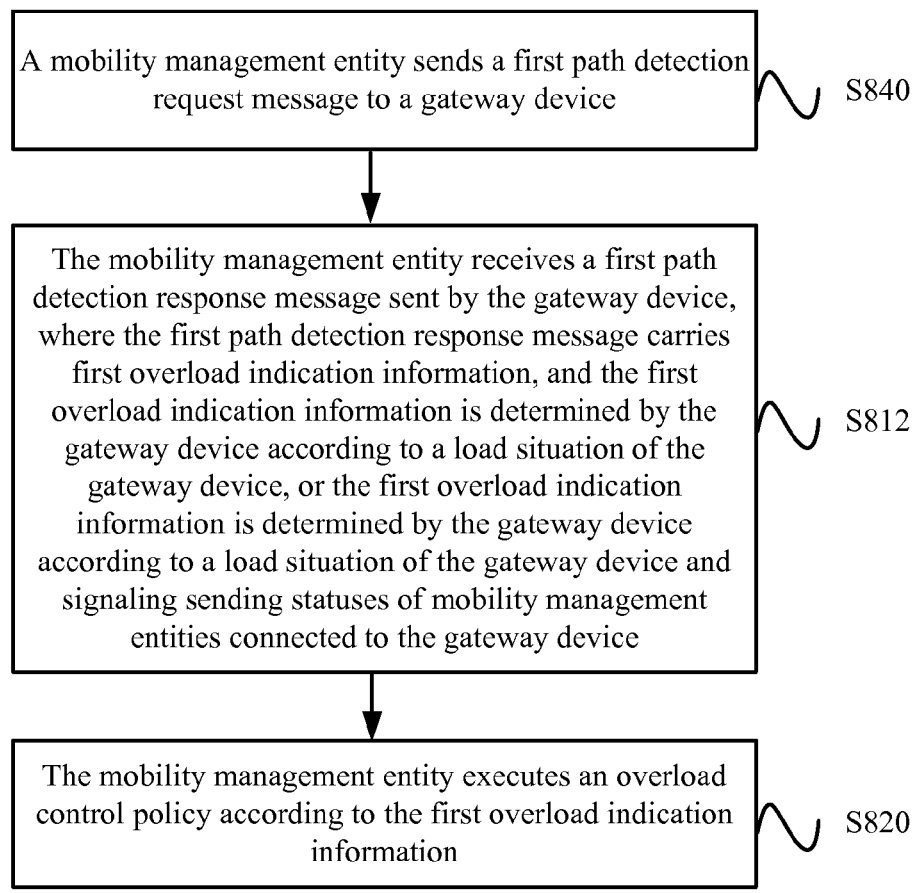
FIG. 10 is still another schematic flowchart of an overload control method according to another embodiment of the present invention.

In this embodiment of the present invention, as shown in FIG. 10, optionally, before S810, the method 800 further includes:

S840. The mobility management entity sends a first path detection request message to the gateway device.

S810 includes:

S812. The mobility management entity receives a first path detection response message sent by the gateway device, where the first path detection response message carries the first overload indication information, and the first overload indication information is determined by the gateway device according to a load status of the gateway device, or the first overload indication information is determined by the gateway device according to a load status of the gateway device and signaling sending statuses of mobility management entities connected to the gateway device.

In this embodiment, the overload indication information is sent by using a path detection message. The mobility management entity sends the first path detection request message to the gateway device. The gateway device determines the first overload indication information according to the load status of the gateway device, or the gateway device determines the first overload indication information according to the load status of the gateway device and the signaling sending statuses of the mobility management entities connected to the gateway device. The first overload indication information is included in the first path detection response message that is to be sent to the mobility management entity, so as to indicate the overload control policy. After receiving the first path detection response message, the mobility management entity executes the overload control policy according to the first overload indication information carried in the first path detection response message, so as to perform control on overload of the gateway device.

In this embodiment of the present invention, optionally, the gateway device is an SGW. As shown in FIG. 11, before S810, the method 800 further includes:

S850. The mobility management entity sends a first control request message to the SGW, so that the SGW sends a second control request message to a packet data network gateway PGW and receives a second control response message sent by the PGW, where the second control response message carries second overload indication information that is determined by the PGW and used to indicate the overload control policy.

S810 includes:

S813. The mobility management entity receives a first control response message sent by the SGW, where the first control response message carries the first overload indication information, and the first overload indication information is the second overload indication information forwarded by the SGW, or the first overload indication information is determined by the SGW according to the second overload indication information and signaling sending statuses of mobility management entities connected to the SGW.

In an LTE system, when a PGW is overloaded, control on overload of the PGW needs to be performed. In this embodiment, the overload indication information is sent by using a control message. The mobility management entity sends the first control request message to the SGW. The SGW sends the second control request message to the PGW. The PGW determines the second overload indication information used to indicate the overload control policy. Optionally, the PGW determines the second overload indication information according to a load status of the PGW, or the PGW determines the second overload indication information according to a load status of the PGW and signaling sending statuses of SGWs connected to the PGW. The PGW includes the second overload indication information in the second control response message that is to be sent to the SGW, so as to indicate the overload control policy. The SGW uses the second overload indication information as the first overload indication information that is to be sent to the mobility management entity (that is, forwards the overload indication information sent by the PGW), or the SGW determines the first overload indication information according to the second overload indication information and the signaling sending statuses of the mobility management entities connected to the SGW. The SGW includes the first overload indication information in the first control response message that is to be sent to the mobility management entity, so as to indicate the overload control policy. After receiving the first control response message, the mobility management entity executes the overload control policy according to the first overload indication information, so as to implement control on overload of the PGW.

Figure 12:
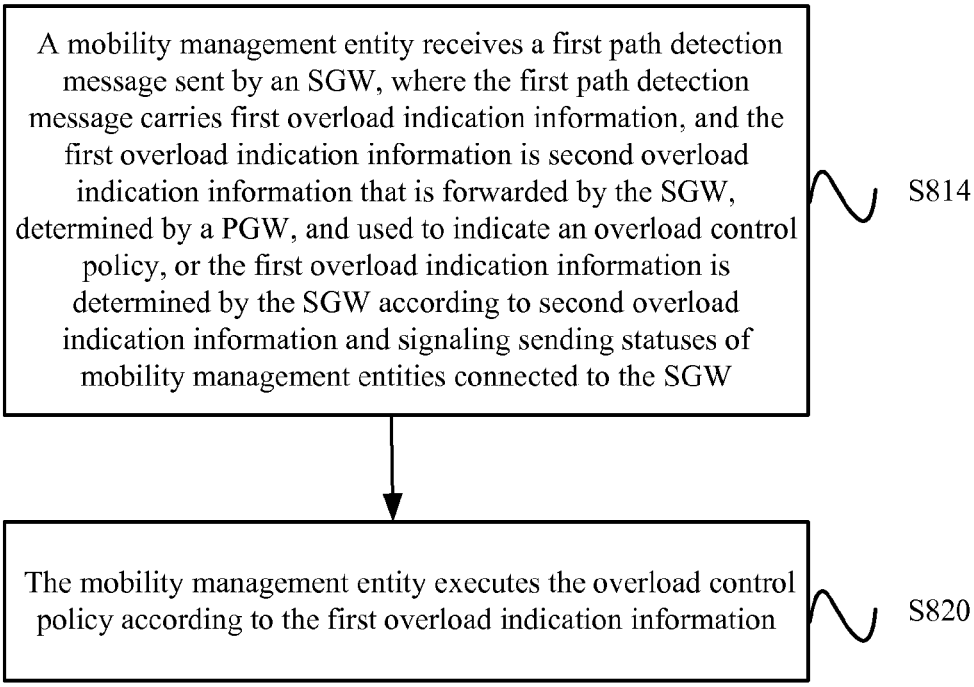
FIG. 12 is still another schematic flowchart of an overload control method according to another embodiment of the present invention.

In this embodiment of the present invention, optionally, the gateway device is an SGW. As shown in FIG. 12, S810 includes:

S814. The mobility management entity receives a first path detection message sent by the SGW, where the first path detection message carries the first overload indication information, and the first overload indication information is second overload indication information that is forwarded by the SGW, determined by the PGW, and used to indicate the overload control policy, or the first overload indication information is determined by the SGW according to the second overload indication information and signaling sending statuses of mobility management entities connected to the SGW.

In this embodiment, the overload indication information is sent by using a path detection message. After receiving the second overload indication information that is sent by the PGW and used to indicate the overload control policy, the SGW uses the second overload indication information as the first overload indication information that is to be sent to the mobility management entity (that is, forwards the overload indication information sent by the PGW), or the SGW determines the first overload indication information according to the second overload indication information and the signaling sending statuses of the mobility management entities connected to the SGW. The SGW includes the first overload indication information in the first path detection message that is to be sent to the mobility management entity, so as to indicate the overload control policy. After receiving the first path detection message, the mobility management entity executes the overload control policy according to the first overload indication information, so as to implement control on overload of the PGW.

Figure 13:
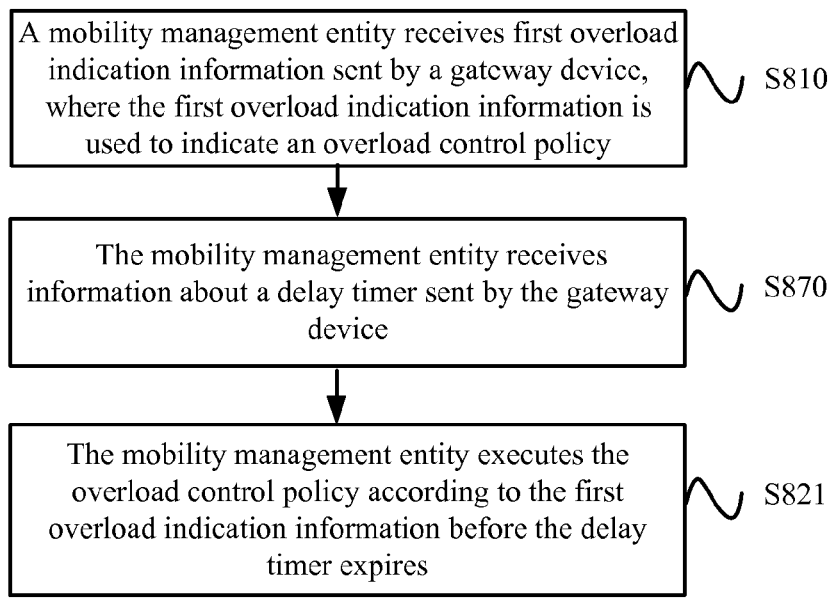
FIG. 13 is still another schematic flowchart of an overload control method according to another embodiment of the present invention.

In this embodiment of the present invention, as shown in FIG. 13, optionally, the method 800 further includes:

S870. The mobility management entity receives information about a delay timer sent by the gateway device.

S820 includes:

S821. The mobility management entity executes the overload control policy according to the first overload indication information before the delay timer expires.

Specifically, in addition to sending the overload indication information, the gateway device further simultaneously sends the information about the delay timer to the mobility management entity, so as to instruct the mobility management entity to: execute the overload control policy to perform overload control before the delay timer expires and no longer perform overload control after the delay timer expires. Upon receiving the overload indication information and the information about the delay timer that are sent by the gateway device, the mobility management entity starts to execute the overload control policy before the delay timer expires, and ends overload control after the delay timer expires. In this way, the mobility management entity may be instructed, by using the information about the delay timer, to perform overload control in a particular time, without requiring the mobility management entity to determine a time for performing overload control. Therefore, the gateway device may adjust the time for performing overload control, which can implement overload control more effectively.

Figure 14:
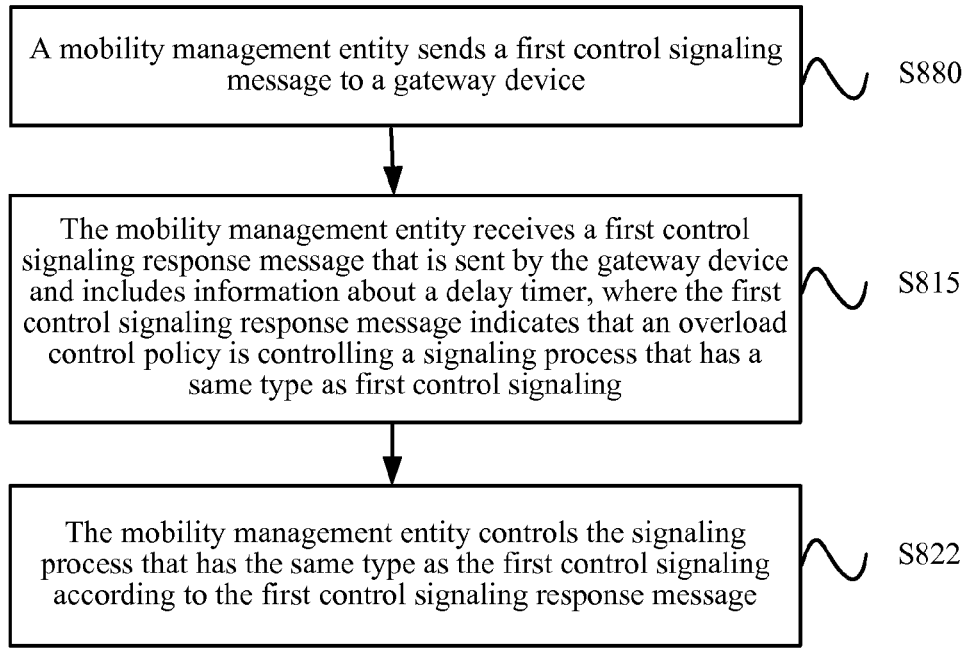
FIG. 14 is still another schematic flowchart of an overload control method according to another embodiment of the present invention.

In this embodiment of the present invention, as shown in FIG. 14, optionally, before S810, the method 800 further includes:

S880. The mobility management entity sends a first control signaling message to the gateway device.

S810 includes:

S815. The mobility management entity receives a first control signaling response message that is sent by the gateway device and includes information about a delay timer, where the first control signaling response message indicates that the overload control policy is controlling a signaling process that has a same type as first control signaling.

S820 includes:

S822. The mobility management entity controls the signaling process that has the same type as the first control signaling according to the first control signaling response message.

In this embodiment, the first control signaling response message that includes the information about the delay timer is used to instruct to execute the overload control policy of controlling a signaling process that has a same type as the control signaling. That is, the first control signaling response message that includes the information about the delay timer is associated with controlling the signaling process that has the same type as the control signaling. After the mobility management entity sends the first control signaling message to the gateway device, the gateway device instructs, by sending the first control signaling response message that includes the information about the delay timer to the mobility management entity, the mobility management entity to control the signaling process that has the same type as the control signaling before the delay timer expires. After receiving the first control signaling response message that is sent by the gateway device and includes the information about the delay timer, the mobility management entity starts to control the signaling process that has the same type as the control signaling before the delay timer expires.

Optionally, the first control signaling response message further includes an overload control rate.

S820 includes: controlling, by the mobility management entity according to the overload control rate, the signaling process that has the same type as the first control signaling.

That is, the first control signaling response message may further include an overload control rate, for example, "a %". After receiving the first control signaling response message that includes the information about the delay timer, and the overload control rate, the mobility management entity controls the signaling process that has the same type as the control signaling according to the overload control rate.

It should be understood that in this embodiment of the present invention, interactions between a gateway device, a mobility management entity, and a PGW, related features, and functions that are described from the side of the mobility management entity are corresponding to those described from the side of the gateway device. For brevity, details are not described herein again.

According to the overload control method in this embodiment of the present invention, an overload control policy is executed according to overload indication information that is sent by a gateway device and used to indicate the overload control policy, which can avoid adverse impact brought by device overload; therefore, the device overload can be effectively controlled.

The foregoing describes in detail the overload control method in the embodiment of the present invention from a perspective of a gateway device with reference to FIG. 1 to FIG. 7, and describes in detail the overload control method in the embodiment of the present invention from a perspective of a mobility management entity with reference to FIG. 8 to FIG. 14. The following describes in detail an overload control method in an embodiment of the present invention from a perspective of a PGW with reference to FIG. 15 to FIG. 19.

Figure 15:
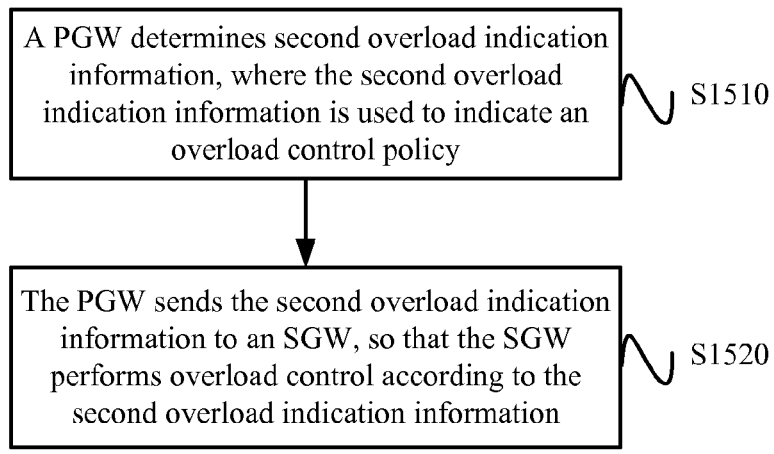
FIG. 15 is a schematic flowchart of an overload control method according to still another embodiment of the present invention.

FIG. 15 shows a schematic flowchart of an overload control method 1500 according to an embodiment of the present invention. As shown in FIG. 15, the method 1500 includes:

S1510. A PGW determines second overload indication information, where the second overload indication information is used to indicate an overload control policy.

S1520. The PGW sends the second overload indication information to an SGW, so that the SGW performs overload control according to the second overload indication information.

When the PGW is overloaded, control on overload of the PGW needs to be performed. In this embodiment of the present invention, after determining the second overload indication information used to indicate the overload control policy, the PGW sends the second overload indication information to the SGW, and the SGW performs overload control according to the second overload indication information. Optionally, the SGW executes the overload control policy according to the second overload indication information. Alternatively, the SGW uses the second overload indication information as first overload indication information that is to be sent to the mobility management entity (that is, forwards overload indication information sent by the PGW), or the SGW determines first overload indication information according to the second overload indication information and signaling sending statuses of mobility management entities connected to the SGW. Then, the mobility management entity executes the overload control policy according to the first overload indication information, so as to implement control on overload of the PGW.

Therefore, according to the overload control method in this embodiment of the present invention, second overload indication information used to indicate an overload control policy is sent to an SGW, so that the SGW determines, according to the second overload indication information, first overload indication information that is to be sent to a mobility management entity and used to indicate the overload control policy, which can implement control on overload of the PGW and avoid adverse impact brought by device overload; therefore, the device overload can be effectively controlled.

In this embodiment of the present invention, optionally, the overload control policy includes: limiting a quantity of initial access users, delaying signaling in a mobility management process, delaying signaling in a service request process, or delaying signaling in a session management process.

In this embodiment of the present invention, optionally, the second overload indication information includes an indication or overload status information associated with the overload control policy.

Optionally, the second overload indication information further includes an overload control rate.

It should be understood that a specific form of the second overload indication information is similar to the first overload indication information, and refer to the foregoing embodiments. For brevity, details are not described herein again.

Figure 16:
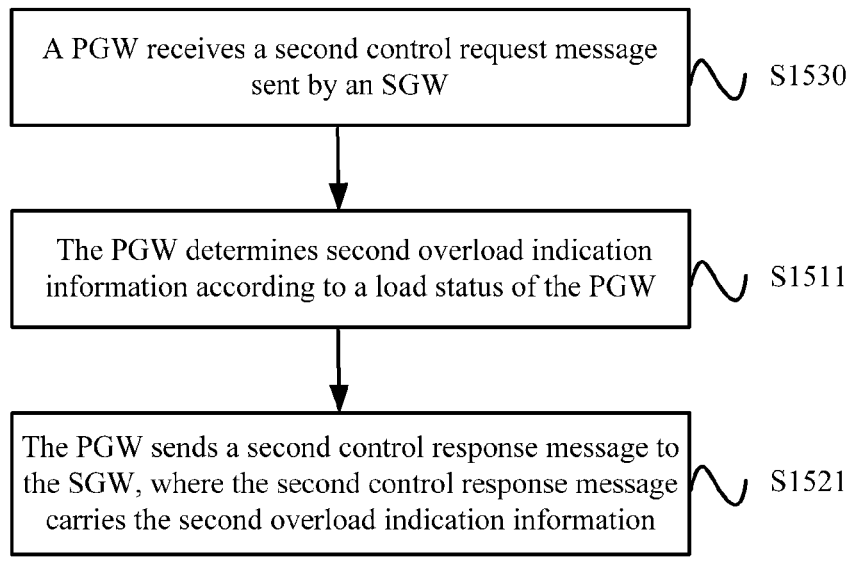
FIG. 16 is another schematic flowchart of an overload control method according to still another embodiment of the present invention.

In this embodiment of the present invention, as shown in FIG. 16, optionally, before S1510, the method 1500 further includes:

S1530. The PGW receives a second control request message sent by the SGW.

S1510 includes:

S1511. The PGW determines the second overload indication information according to a load status of the PGW.

S1520 includes:

S1521. The PGW sends a second control response message to the SGW, where the second control response message carries the second overload indication information.

In this embodiment, the overload indication information is sent by using a control message. The SGW sends the second control request message to the PGW. The PGW determines the second overload indication information according to the load status of the PGW, and includes the second overload indication information in the second control response message that is to be sent to the SGW, so as to indicate the overload control policy.

Optionally, S1511 includes:

determining, by the PGW, the second overload indication information according to the load status of the PGW and signaling sending statuses of SGWs connected to the PGW.

When the PGW is connected to multiple SGWs, differentiated processing may be performed on different SGWs. The PGW determines overload indication information for SGWs according to the load status of the PGW and signaling sending statuses of the SGWs, so as to indicate different overload control policies.

Figure 17:
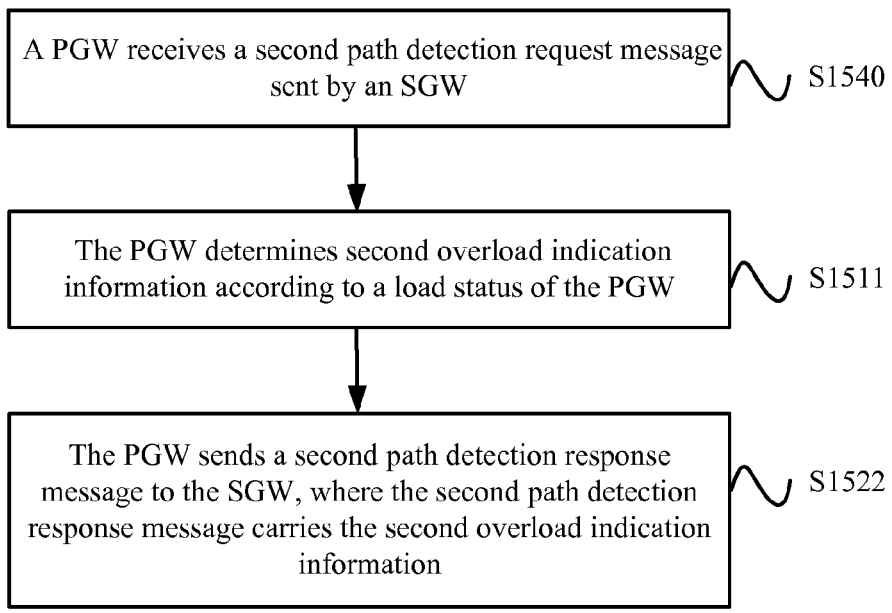
FIG. 17 is still another schematic flowchart of an overload control method according to still another embodiment of the present invention.

In this embodiment of the present invention, as shown in FIG. 17, optionally, before S1510, the method 1500 further includes:

S1540. The PGW receives a second path detection request message sent by the SGW.

S1510 includes:

S1511. The PGW determines the second overload indication information according to a load status of the PGW.

S1520 includes:

S1522. The PGW sends a second path detection response message to the SGW, where the second path detection response message carries the second overload indication information.

In this embodiment, the overload indication information is sent by using a path detection message. The SGW sends the second path detection request message to the PGW. The PGW determines the second overload indication information according to the load status of the PGW, and includes the second overload indication information in the second path detection response message that is to be sent to the SGW, so as to indicate the overload control policy.

Similar to the foregoing embodiment, S1511 includes: determining, by the PGW, the second overload indication information according to the load status of the PGW and signaling sending statuses of SGWs connected to the PGW.

For specific description, refer to the foregoing embodiment, and details are not described herein again.

Figure 18:
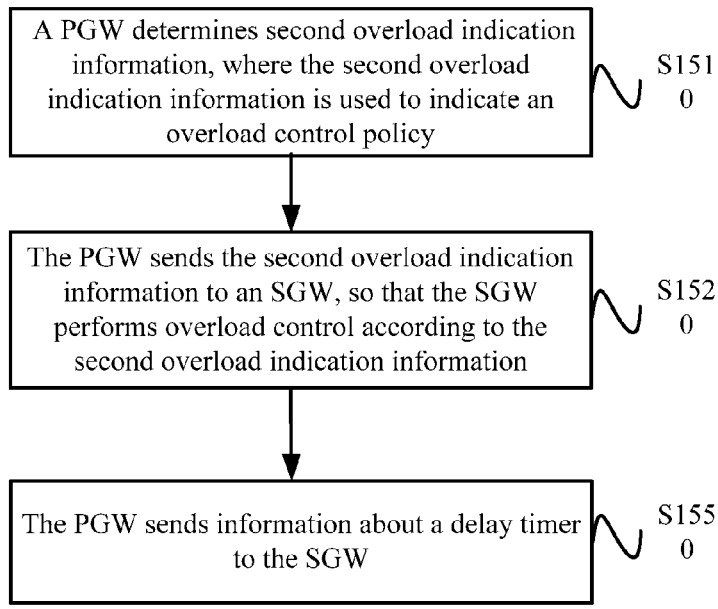
FIG. 18 is still another schematic flowchart of an overload control method according to still another embodiment of the present invention.

In this embodiment of the present invention, as shown in FIG. 18, optionally, the method 1500 further includes:

S1550. The PGW sends information about a delay timer to the SGW.

In addition to sending the overload indication information, the PGW further simultaneously sends the information about the delay timer to the SGW. In this way, when sending the overload indication information to the mobility management entity, the SGW further simultaneously sends the information about the delay timer, so as to instruct the mobility management entity to: execute the overload control policy to perform overload control before the delay timer expires and no longer perform overload control after the delay timer expires.

Figure 19:
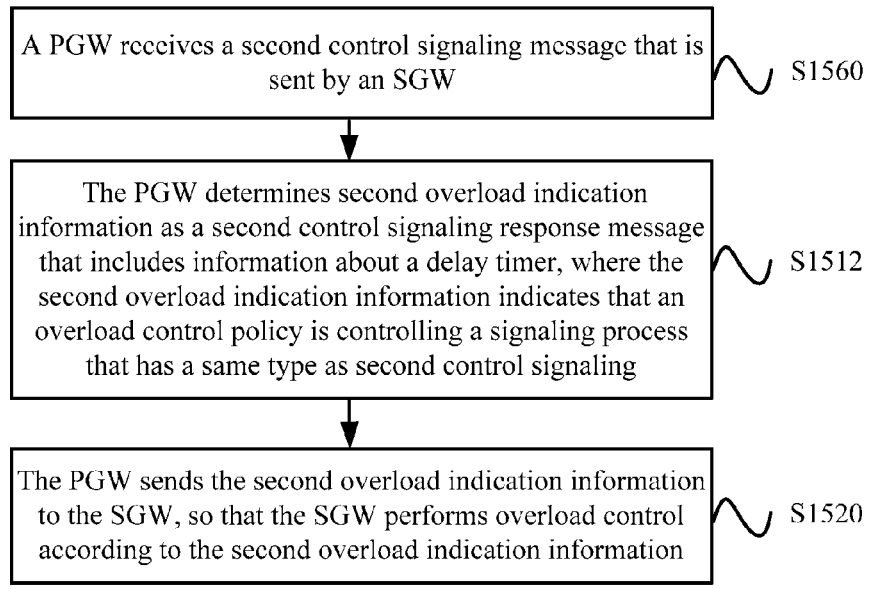
FIG. 19 is still another schematic flowchart of an overload control method according to still another embodiment of the present invention.

In this embodiment of the present invention, as shown in FIG. 19, optionally, before S1510, the method 1500 further includes:

S1560. The PGW receives a second control signaling message that is sent by the SGW.

S1510 includes:

S1512. The PGW determines that the second overload indication information as a second control signaling response message that includes information about a delay timer, where the second overload indication information indicates that the overload control policy is controlling a signaling process that has a same type as the second control signaling.

In this embodiment, the second control signaling response message that includes the information about the delay timer is used to instruct to execute the overload control policy of controlling a signaling process that has a same type as the control signaling. That is, the second control signaling response message that includes the information about the delay timer is associated with controlling the signaling process that has the same type as the control signaling. After receiving a control signaling message that is sent by the SGW, the PGW sends the second control signaling response message that includes the information about the delay timer to the SGW, and the SGW sends the second control signaling response message that includes the information about the delay timer to the mobility management entity, so as to instruct the mobility management entity to control the signaling process that has the same type as the control signaling before the delay timer expires.

Optionally, S1512 includes: determining, by the PGW, the second overload indication information as the second control signaling response message that includes the information about the delay timer, and an overload control rate.

That is, the second control signaling response message may further include an overload control rate, for example, "a %".

It should be understood that in this embodiment of the present invention, interactions between a gateway device, a mobility management entity, and a PGW, related features, and functions that are described from the side of the mobility management entity are corresponding to those described from the side of the gateway device. For brevity, details are not described herein again.

According to the overload control method in this embodiment of the present invention, second overload indication information used to indicate an overload control policy is sent to an SGW, which can implement control on overload of a PGW and avoid adverse impact brought by device overload; therefore, the device overload can be effectively controlled.

The following describes in detail embodiments of the present invention with reference to specific examples. It should be noted that these example are merely intended to help a person skilled in the art better understand the embodiments of the present invention, but are not intended to limit the scope of the embodiments of the present invention.

Figure 20:
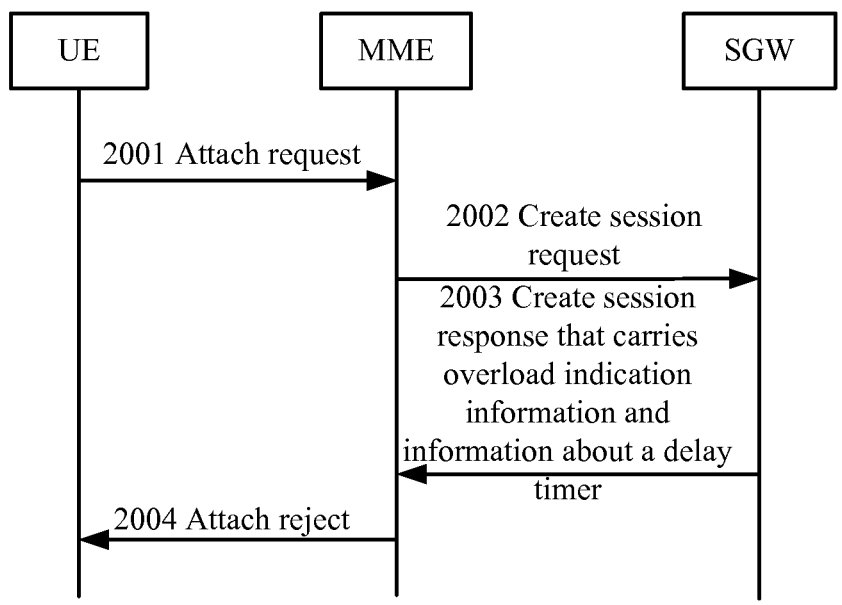
FIG. 20 is a schematic interaction diagram of an overload control method according to an embodiment of the present invention.

An attach procedure in an LTE system is used as an example. As shown in FIG. 20, when an SGW is overloaded, an overload control procedure is as follows:

2001. A UE initiates an attach request to an MME.

2002. The MME sends a create session request to the SGW.

2003. The SGW sends a create session response to the MME, where the create session response carries overload indication information and information about a delay timer. For example, the create session response carries an indication 1 instructing to limit a quantity of initial access users.

2004. The MME sends an attach reject message to the UE. The MME executes an overload control policy according to the create session response to reject attach of the UE.

Figure 21:
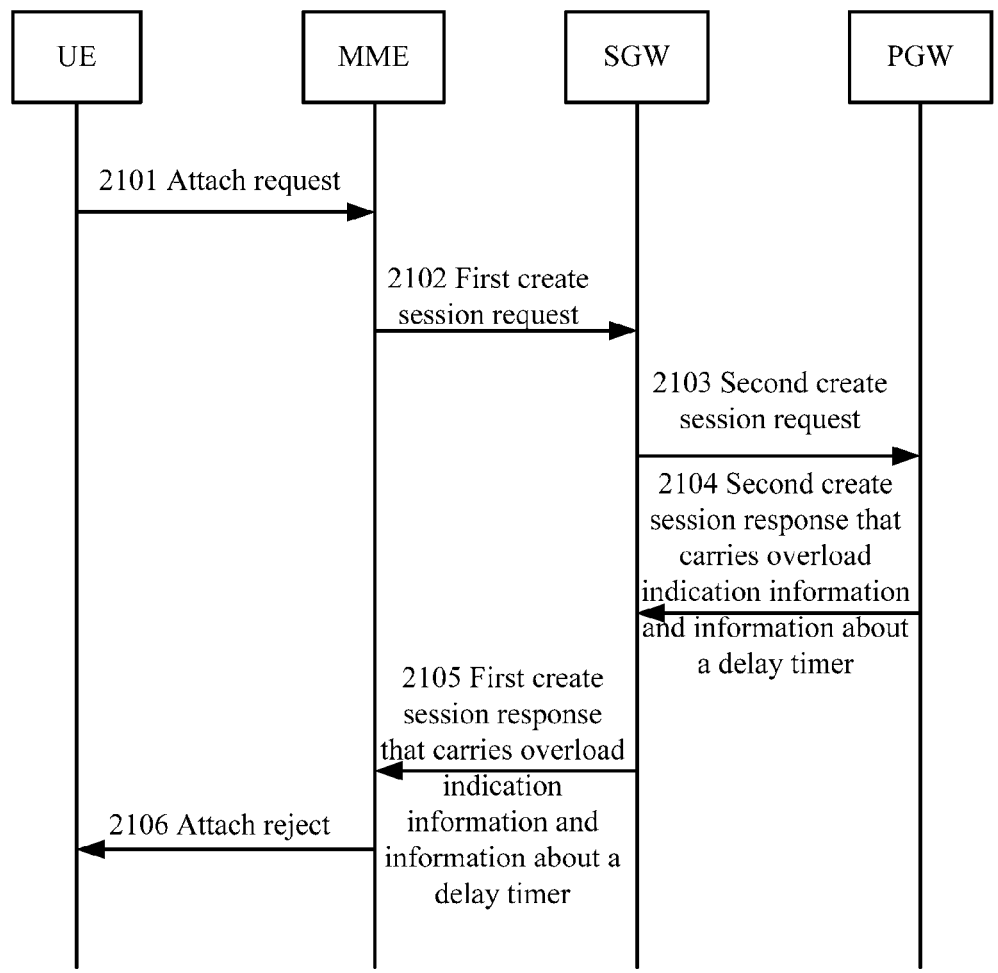
FIG. 21 is a schematic interaction diagram of an overload control method according to another embodiment of the present invention.

As shown in FIG. 21, when a PGW is overloaded, an overload control procedure is as follows:

2101. A UE initiates an attach request to an MME.

2102. The MME sends a first create session request to an SGW.

2103. The SGW sends a second create session request to the PGW.

2104. The PGW sends a second create session response to the SGW, where the second create session response carries overload indication information and information about a delay timer.

2105. The SGW sends a first create session response to the MME, where the first create session response carries overload indication information and information about a delay timer. The overload indication information of the PGW may be directly forwarded, or overload indication information may be determined according to the overload indication information of the PGW and signaling sending statuses of MMEs.

2106. The MME sends an attach reject message to the UE. The MME executes an overload control policy according to the first create session response to reject attach of the UE.

Figure 22:
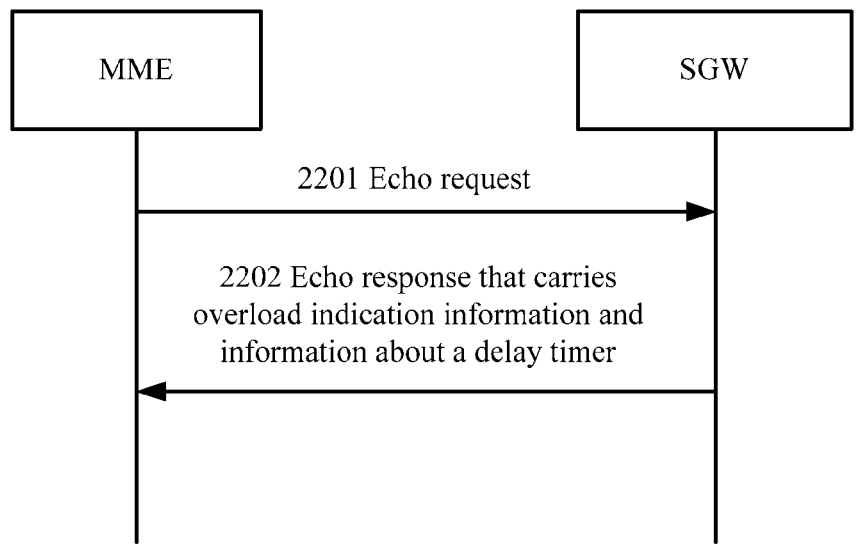
FIG. 22 is a schematic interaction diagram of an overload control method according to still another embodiment of the present invention.

FIG. 22 is a flowchart of implementing overload control by using a path detection message.

2201. An MME sends an Echo request to an SGW.

2202. The SGW sends an Echo response to the MME, where the Echo response carries overload indication information and information about a delay timer. The MME executes an overload control policy according to the Echo response to start overload control, and end overload control when the delay timer expires.

Figure 23:
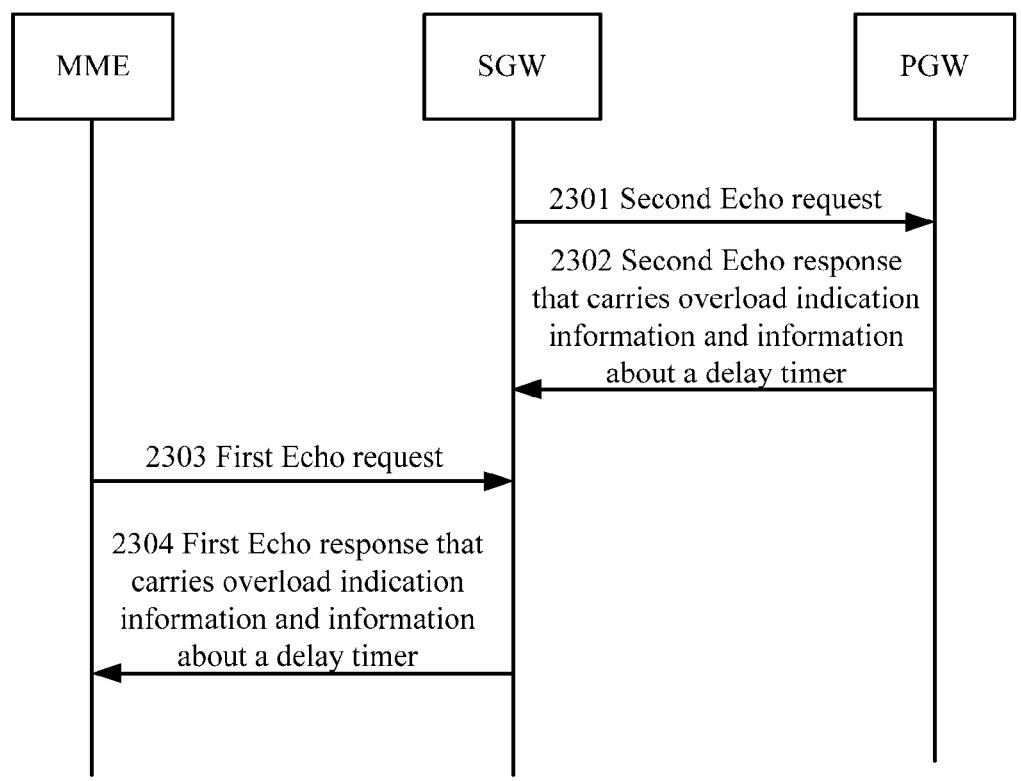
FIG. 23 is a schematic interaction diagram of an overload control method according to still another embodiment of the present invention.

For a scenario in which a PGW is overloaded, a procedure of performing overload control is shown in FIG. 23.

2301. An SGW sends a second Echo request to the PGW.

2302. The PGW sends a second Echo response to the SGW, where the second Echo response carries overload indication information and information about a delay timer.

2303. An MME sends a first Echo request to the SGW.

2304. The SGW sends a first Echo response to the MME, where the first Echo response carries overload indication information and information about a delay timer. The overload indication information of the PGW may be directly forwarded, or overload indication information may be determined according to the overload indication information of the PGW and signaling sending statuses of MMEs. The MME executes an overload control policy according to the first Echo response.

It should be understood that in various embodiments of the present invention, sequence numbers of the foregoing processes do not mean execution sequences. The execution sequences of the processes should be determined according to functions and internal logic of the processes, and should not be construed as any limitation on the implementation processes of the embodiments of the present invention.

The foregoing describes in detail the overload control methods in the embodiments of the present invention with reference to FIG. 1 to FIG. 23. The following describes in detail a gateway device, a mobility management entity, and a PGW in embodiments of the present invention with reference to FIG. 24 to FIG. 29.

Figure 24:
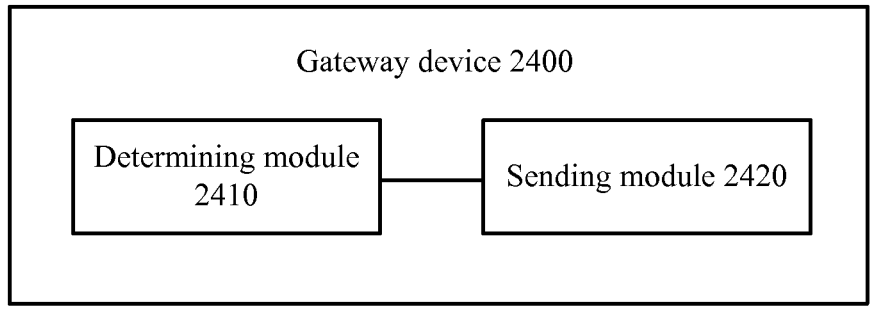
FIG. 24 is a schematic block diagram of a gateway device according to an embodiment of the present invention.

FIG. 24 shows a schematic block diagram of a gateway device 2400 according to an embodiment of the present invention. As shown in FIG. 24, the gateway device 2400 includes:

a determining module 2410, configured to determine first overload indication information, where the first overload indication information is used to indicate an overload control policy; and a sending module 2420, configured to send the first overload indication information to a mobility management entity, so that the mobility management entity executes the overload control policy according to the first overload indication information.

According to the gateway device in this embodiment of the present invention, overload indication information used to indicate an overload control policy is sent to a mobility management entity, so that the mobility management entity executes the overload control policy, which can avoid adverse impact brought by device overload; therefore, the device overload can be effectively controlled.

In this embodiment of the present invention, optionally, the gateway device 2400 further includes:

a first receiving module, configured to: before the determining module 2410 determines the first overload indication information, receive a first control request message sent by the mobility management entity.

The determining module 2410 is specifically configured to determine the first overload indication information according to a load status of the gateway device.

The sending module 2420 is specifically configured to send a first control response message to the mobility management entity, where the first control response message carries the first overload indication information.

In this embodiment of the present invention, optionally, the gateway device 2400 further includes:

a second receiving module, configured to: before the determining module 2410 determines the first overload indication information, receive a first path detection request message sent by the mobility management entity.

The determining module 2410 is specifically configured to determine the first overload indication information according to a load status of the gateway device.

The sending module 2420 is specifically configured to send a first path detection response message to the mobility management entity, where the first path detection response message carries the first overload indication information.

In this embodiment of the present invention, optionally, the determining module 2410 is specifically configured to determine the first overload indication information according to the load status of the gateway device and signaling sending statuses of mobility management entities connected to the gateway device.

In this embodiment of the present invention, optionally, the gateway device 2400 is an SGW.

The gateway device 2400 further includes:

a third receiving module, configured to: before the determining module 2410 determines the first overload indication information, receive a first control request message sent by the mobility management entity.

The sending module 2420 is further configured to send a second control request message to a packet data network gateway PGW.

The third receiving module is further configured to receive a second control response message sent by the PGW, where the second control response message carries second overload indication information that is determined by the PGW and used to indicate the overload control policy.

The determining module 2410 is specifically configured to: determine the second overload indication information as the first overload indication information, or determine the first overload indication information according to the second overload indication information and signaling sending statuses of mobility management entities connected to the SGW.

The sending module 2420 is specifically configured to send a first control response message to the mobility management entity, where the first control response message carries the first overload indication information.

In this embodiment of the present invention, optionally, the gateway device 2400 is an SGW.

The sending module 2420 is further configured to: before the determining module 2410 determines the first overload indication information, send a second path detection request message to a PGW.

The gateway device 2400 further includes: a fourth receiving module, configured to receive a second path detection response message sent by the PGW, where the second path detection response message carries second overload indication information that is determined by the PGW and used to indicate the overload control policy.

The determining module 2410 is specifically configured to: determine the second overload indication information as the first overload indication information, or determine the first overload indication information according to the second overload indication information and signaling sending statuses of mobility management entities connected to the SGW.

The sending module 2420 is specifically configured to send a first path detection message to the mobility management entity, where the first path detection message carries the first overload indication information.

In this embodiment of the present invention, optionally, the sending module 2420 is further configured to send information about a delay timer to the mobility management entity, so that the mobility management entity executes the overload control policy according to the first overload indication information before the delay timer expires.

In this embodiment of the present invention, optionally, the overload control policy includes: limiting a quantity of initial access users, delaying signaling in a mobility management process, delaying signaling in a service request process, or delaying signaling in a session management process.

In this embodiment of the present invention, optionally, the first overload indication information includes an indication or overload status information associated with the overload control policy.

Optionally, the first overload indication information further includes an overload control rate.

In this embodiment of the present invention, optionally, the gateway device 2400 further includes: a fifth receiving module, configured to: before the determining module 2410 determines the first overload indication information, receive a first control signaling message that is sent by the mobility management entity.

The determining module 2410 is specifically configured to determine the first overload indication information as a first control signaling response message that includes information about a delay timer, where the first overload indication information indicates that the overload control policy is controlling a signaling process that has a same type as first control signaling.

Optionally, the determining module 2410 is specifically configured to determine the first overload indication information as the first control signaling response message that includes the information about the delay timer, and an overload control rate.

The gateway device 2400 according to this embodiment of the present invention may be corresponding to a gateway device in an overload control method according to the embodiments of the present invention, and the foregoing and other operations and/or functions of modules in the gateway device 2400 are separately used to implement corresponding procedures of the methods in FIG. 1 to FIG. 23. For brevity, details are not described herein again.

According to the gateway device in this embodiment of the present invention, overload indication information used to indicate an overload control policy is sent to a mobility management entity, so that the mobility management entity executes the overload control policy according to the overload indication information, which can avoid adverse impact brought by device overload; therefore, the device overload can be effectively controlled.

Figure 25:
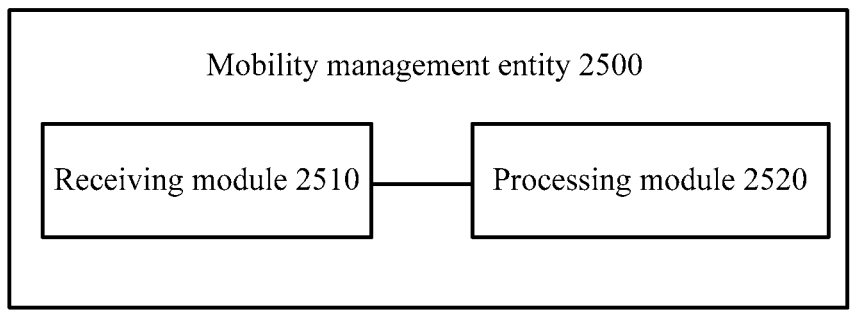
FIG. 25 is a schematic block diagram of a mobility management entity according to an embodiment of the present invention.

FIG. 25 is a schematic block diagram of a mobility management entity 2500 according to an embodiment of the present invention. As show in FIG. 25, the mobility management entity 2500 includes:

a receiving module 2510, configured to receive first overload indication information sent by a gateway device, where the first overload indication information is used to indicate an overload control policy; and a processing module 2520, configured to execute the overload control policy according to the first overload indication information.

According to the mobility management entity in this embodiment of the present invention, overload indication information that is sent by a gateway device and used to indicate an overload control policy is received, and the overload control policy is executed according to the overload indication information, which can avoid adverse impact brought by device overload; therefore, the device overload can be effectively controlled.

In this embodiment of the present invention, optionally, the mobility management entity 2500 further includes:

a first sending module, configured to: before the receiving module 2510 receives the first overload indication information sent by the gateway device, send a first control request message to the gateway device.

The receiving module 2510 is specifically configured to receive a first control response message sent by the gateway device, where the first control response message carries the first overload indication information, and the first overload indication information is determined by the gateway device according to a load status of the gateway device, or the first overload indication information is determined by the gateway device according to a load status of the gateway device and signaling sending statuses of mobility management entities connected to the gateway device.

In this embodiment of the present invention, optionally, the mobility management entity 2500 further includes:

a second sending module, configured to: before the receiving module 2510 receives the first overload indication information sent by the gateway device, send a first path detection request message to the gateway device.

The receiving module 2510 is specifically configured to receive a first path detection response message sent by the gateway device, where the first path detection response message carries the first overload indication information, and the first overload indication information is determined by the gateway device according to a load status of the gateway device, or the first overload indication information is determined by the gateway device according to a load status of the gateway device and signaling sending statuses of mobility management entities connected to the gateway device.

In this embodiment of the present invention, optionally, the gateway device is an SGW.

The mobility management entity 2500 further includes: a third sending module, configured to: before the receiving module 2510 receives the first overload indication information sent by the gateway device, send a first control request message to the SGW, so that the SGW sends a second control request message to a packet data network gateway PGW and receives a second control response message sent by the PGW, where the second control response message carries second overload indication information that is determined by the PGW and used to indicate the overload control policy.

The receiving module 2510 is specifically configured to receive a first control response message sent by the SGW, where the first control response message carries the first overload indication information, and the first overload indication information is the second overload indication information forwarded by the SGW, or the first overload indication information is determined by the SGW according to the second overload indication information and signaling sending statuses of mobility management entities connected to the SGW.

In this embodiment of the present invention, optionally, the gateway device is an SGW.

The receiving module 2510 is specifically configured to receive a first path detection message sent by the SGW, where the first path detection message carries the first overload indication information, and the first overload indication information is second overload indication information that is forwarded by the SGW, determined by the PGW, and used to indicate the overload control policy, or the first overload indication information is determined by the SGW according to the second overload indication information and signaling sending statuses of mobility management entities connected to the SGW.

In this embodiment of the present invention, optionally, the receiving module 2510 is further configured to receive information about a delay timer sent by the gateway device.

The processing module 2520 is specifically configured to execute the overload control policy according to the first overload indication information before the delay timer expires.

In this embodiment of the present invention, optionally, the overload control policy includes: limiting a quantity of initial access users, delaying signaling in a mobility management process, delaying signaling in a service request process, or delaying signaling in a session management process.

In this embodiment of the present invention, optionally, the first overload indication information includes an indication or overload status information associated with the overload control policy.

The processing module 2520 is specifically configured to execute the overload control policy associated with the indication or the overload status information.

In this embodiment of the present invention, optionally, the first overload indication information further includes an overload control rate.

The processing module 2520 is specifically configured to execute, according to the overload control rate, the overload control policy associated with the indication or the overload status information.

In this embodiment of the present invention, optionally, the mobility management entity 2500 further includes: a fourth sending module, configured to: before the receiving module 2510 receives the first overload indication information sent by the gateway device, send a first control signaling message to the gateway device.

The receiving module 2510 is specifically configured to receive a first control signaling response message that is sent by the gateway device and includes information about a delay timer, where the first control signaling response message indicates that the overload control policy is controlling a signaling process that has a same type as first control signaling.

The processing module 2520 is specifically configured to control, according to the first control signaling response message, the signaling process that has the same type as the first control signaling.

In this embodiment of the present invention, optionally, the first control signaling response message further includes an overload control rate.

The processing module 2520 is specifically configured to control, according to the overload control rate, the signaling process that has the same type as the first control signaling.

The mobility management entity 2500 according to this embodiment of the present invention may be corresponding to a mobility management entity in an overload control method according to the embodiments of the present invention, and the foregoing and other operations and/or functions of modules in the mobility management entity 2500 are separately used to implement corresponding procedures of the methods in FIG. 1 to FIG. 23. For brevity, details are not described herein again.

According to the mobility management entity in this embodiment of the present invention, an overload control policy is executed according to overload indication information that is sent by a gateway device and used to indicate the overload control policy, which can avoid adverse impact brought by device overload; therefore, the device overload can be effectively controlled.

Figure 26:
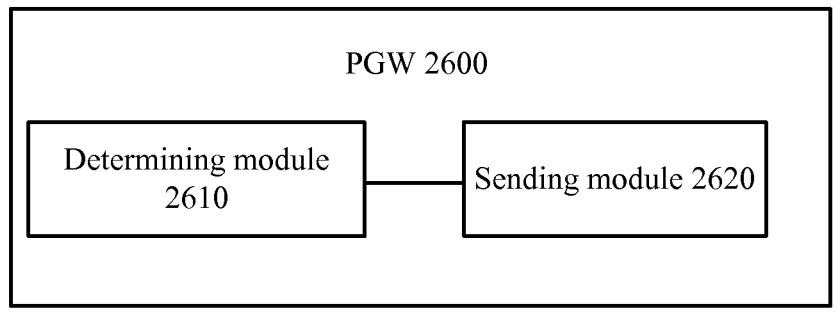
FIG. 26 is a schematic block diagram of a PGW according to an embodiment of the present invention.

FIG. 26 is a schematic block diagram of a PGW 2600 according to an embodiment of the present invention. As shown in FIG. 26, the PGW 2600 includes:

a determining module 2610, configured to determine second overload indication information, where the second overload indication information is used to indicate an overload control policy; and a sending module 2620, configured to send the second overload indication information to a serving gateway SGW, so that the SGW performs overload control according to the second overload indication information.

Optionally, the second overload indication information is used to enable the SGW to determine, according to the second overload indication information, first overload indication information that is to be sent to a mobility management entity and used to indicate the overload control policy; or optionally, the second overload indication information is used to enable the SGW to execute the overload control policy according to the second overload indication information.

According to the PGW in this embodiment of the present invention, second overload indication information used to indicate an overload control policy is sent to an SGW, so that the SGW determines, according to the second overload indication information, first overload indication information that is to be sent to a mobility management entity and used to indicate the overload control policy, which can implement control on overload of the PGW and avoid adverse impact brought by device overload; therefore, the device overload can be effectively controlled.

In this embodiment of the present invention, optionally, the PGW 2600 further includes: a first receiving module, configured to: before the determining module 2610 determines the second overload indication information, receive a second control request message sent by the SGW.

The determining module 2610 is specifically configured to determine the second overload indication information according to a load status of the PGW.

The sending module 2620 is specifically configured to send a second control response message to the SGW, where the second control response message carries the second overload indication information.

In this embodiment of the present invention, optionally, the PGW 2600 further includes: a second receiving module, configured to: before the determining module 2610 determines the second overload indication information, receive a second path detection request message sent by the SGW.

The determining module 2610 is specifically configured to determine the second overload indication information according to a load status of the PGW.

The sending module 2620 is specifically configured to send a second path detection response message to the SGW, where the second path detection response message carries the second overload indication information.

In this embodiment of the present invention, optionally, the determining module 2610 is specifically configured to determine the second overload indication information according to the load status of the PGW and signaling sending statuses of SGWs connected to the PGW.

In this embodiment of the present invention, optionally, the sending module 2620 is further configured to send information about a delay timer to the SGW.

In this embodiment of the present invention, optionally, the overload control policy includes: limiting a quantity of initial access users, delaying signaling in a mobility management process, delaying signaling in a service request process, or delaying signaling in a session management process.

In this embodiment of the present invention, optionally, the second overload indication information includes an indication or overload status information associated with the overload control policy.

Optionally, the second overload indication information further includes an overload control rate.

In this embodiment of the present invention, optionally, the PGW 2600 further includes: a third receiving module, configured to: before the determining module 2610 determines the second overload indication information, receive a second control signaling message that is sent by the SGW.

The determining module 2610 is specifically configured to determine the second overload indication information as a second control signaling response message that includes information about a delay timer, where the second overload indication information indicates that the overload control policy is controlling a signaling process that has a same type as the second control signaling.

Optionally, the determining module 2610 is specifically configured to determine the second overload indication information as the second control signaling response message that includes the information about the delay timer, and an overload control rate.

The PGW 2600 according to this embodiment of the present invention may be corresponding to a PGW in an overload control method according to the embodiments of the present invention, and the foregoing and other operations and/or functions of modules in the PGW 2600 are separately used to implement corresponding procedures of the methods in FIG. 1 to FIG. 23. For brevity, details are not described herein again.

According to the PGW in this embodiment of the present invention, second overload indication information used to indicate an overload control policy is sent to an SGW, which can implement control on overload of the PGW and avoid adverse impact brought by device overload; therefore, the device overload can be effectively controlled.

Figure 27:
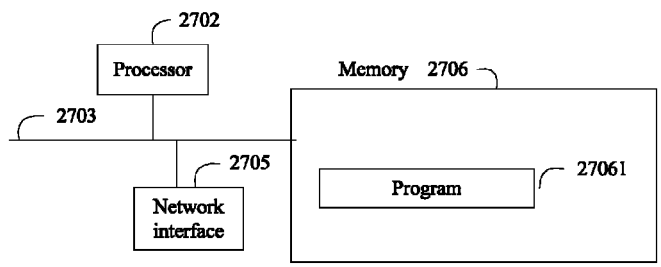
FIG. 27 is a schematic structural diagram of a gateway device according to an embodiment of the present invention.

FIG. 27 shows a structure of a gateway device according to another embodiment of the present invention. The gateway device includes at least one processor 2702 (for example, a CPU), at least one network interface 2705 or another communications interface, a memory 2706, and at least one communications bus 2703 that is configured to implement connection and communication between these apparatuses. The processor 2702 is configured to execute an executable module, for example, a computer program, stored in the memory 2706. The memory 2706 may include a high-speed random access memory (RAM: Random Access Memory), and may further include a non-volatile memory (non-volatile memory), for example, at least one magnetic disk memory. Through at least one network interface 2705 (which may be wired or wireless), a communication connection is implemented between the gateway device and at least one of other network elements over the Internet, a wide area network, a local area network, a metropolitan area network, or the like.

In some implementation manners, a program 27061 is stored in the memory 2706, and the program 27061 may be executed by the processor 2702. This program is configured to perform the following operations: determining, first overload indication information, where the first overload indication information is used to indicate an overload control policy; and sending, by the gateway device, the first overload indication information to a mobility management entity, so that the mobility management entity executes the overload control policy according to the first overload indication information.

Optionally, before the determining, by a gateway device, first overload indication information, the program is further configured to perform: receiving, a first control request message sent by the mobility management entity. The determining, by a gateway device, first overload indication information includes: determining, by the gateway device, the first overload indication information according to a load status of the gateway device. The sending, by the gateway device, the first overload indication information to a mobility management entity includes: sending, by the gateway device, a first control response message to the mobility management entity, where the first control response message carries the first overload indication information.

Optionally, before the determining, by a gateway device, first overload indication information, the program further includes: receiving, by the gateway device, a first path detection request message sent by the mobility management entity. The determining, by a gateway device, first overload indication information includes: determining, by the gateway device, the first overload indication information according to a load status of the gateway device. The sending, by the gateway device, the first overload indication information to a mobility management entity includes: sending, by the gateway device, a first path detection response message to the mobility management entity, where the first path detection response message carries the first overload indication information.

Optionally, the determining, by the gateway device, the first overload indication information according to a load status of the gateway device includes: determining, by the gateway device, the first overload indication information according to the load status of the gateway device and signaling sending statuses of mobility management entities connected to the gateway device.

Optionally, the gateway device is an SGW. Before the determining, by a gateway device, first overload indication information, the program further includes: receiving, by the SGW, a first control request message sent by the mobility management entity; sending, by the SGW, a second control request message to a packet data network gateway PGW; and receiving, by the SGW, a second control response message sent by the PGW, where the second control response message carries second overload indication information that is determined by the PGW and used to indicate the overload control policy. The determining, by a gateway device, first overload indication information includes: determining, by the SGW, the second overload indication information as the first overload indication information, or determining, by the SGW, the first overload indication information according to the second overload indication information and signaling sending statuses of mobility management entities connected to the SGW. The sending, by the gateway device, the first overload indication information to a mobility management entity includes: sending, by the SGW, a first control response message to the mobility management entity, where the first control response message carries the first overload indication information.

Optionally, the gateway device is an SGW. Before the determining, by a gateway device, first overload indication information, the program further includes: sending, by the SGW, a second path detection request message to a PGW; and receiving, by the SGW, a second path detection response message sent by the PGW, where the second path detection response message carries second overload indication information that is determined by the PGW and used to indicate the overload control policy. The determining, by a gateway device, first overload indication information includes: determining, by the SGW, the second overload indication information as the first overload indication information, or determining, by the SGW, the first overload indication information according to the second overload indication information and signaling sending statuses of mobility management entities connected to the SGW. The sending, by the gateway device, the first overload indication information to a mobility management entity includes: sending, by the SGW, a first path detection message to the mobility management entity, where the first path detection message carries the first overload indication information.

Optionally, the program further includes: sending, by the gateway device, information about a delay timer to the mobility management entity, so that the mobility management entity executes the overload control policy according to the first overload indication information before the delay timer expires.

Optionally, the overload control policy includes: limiting a quantity of initial access users, delaying signaling in a mobility management process, delaying signaling in a service request process, or delaying signaling in a session management process.

Optionally, the first overload indication information includes an indication or overload status information associated with the overload control policy.

Optionally, the first overload indication information further includes an overload control rate.

Optionally, before the determining, by a gateway device, first overload indication information, the program further includes: receiving, by the gateway device, a first control signaling message that is sent by the mobility management entity. The determining, by a gateway device, first overload indication information includes: determining, by the gateway device, the first overload indication information as a first control signaling response message that includes information about a delay timer, where the first overload indication information indicates that the overload control policy is controlling a signaling process that has a same type as first control signaling.

Optionally, the determining, by the gateway device, the first overload indication information as a first control signaling response message that includes information about a delay timer includes: determining, by the gateway device, the first overload indication information as the first control signaling response message that includes the information about the delay timer, and an overload control rate.

It may be learned from the foregoing technical solutions in this embodiment of the present invention that in this embodiment of the present invention, overload indication information used to indicate an overload control policy is sent to a mobility management entity, so that the mobility management entity executes the overload control policy, which can avoid adverse impact brought by device overload; therefore, the device overload can be effectively controlled.

Figure 28:
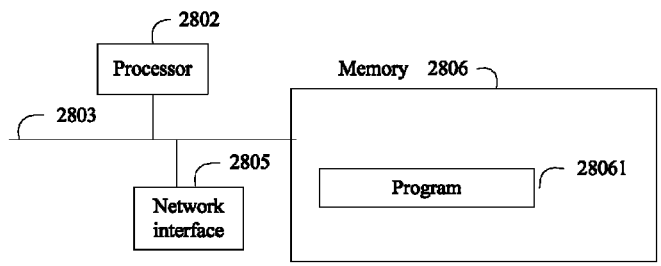
FIG. 28 is a schematic structural diagram of a mobility management entity according to an embodiment of the present invention.

FIG. 28 shows a structure of a mobility management entity according to another embodiment of the present invention. The mobility management entity includes at least one processor 2802 (for example, a CPU), at least one network interface 2805 or another communications interface, a memory 2806, and at least one communications bus 2803 that is configured to implement connection and communication between these apparatuses. The processor 2802 is configured to execute an executable module, for example, a computer program, stored in the memory 2806. The memory 2806 may include a high-speed random access memory (RAM: Random Access Memory), and may further include a non-volatile memory (non-volatile memory), for example, at least one magnetic disk memory. Through at least one network interface 2805 (which may be wired or wireless), a communication connection is implemented between the system gateway and at least one of other network elements over the Internet, a wide area network, a local area network, a metropolitan area network, or the like.

In some implementation manners, a program 28061 is stored in the memory 2806, and the program 28061 may be executed by the processor 2802. This program includes: receiving, by the mobility management entity, first overload indication information sent by a gateway device, where the first overload indication information is used to indicate an overload control policy; and executing, by the mobility management entity, the overload control policy according to the first overload indication information.

Optionally, before the receiving, by a mobility management entity, first overload indication information sent by a gateway device, the program further includes: sending, by the mobility management entity, a first control request message to the gateway device. The receiving, by a mobility management entity, first overload indication information sent by a gateway device includes: receiving, by the mobility management entity, a first control response message sent by the gateway device, where the first control response message carries the first overload indication information, and the first overload indication information is determined by the gateway device according to a load status of the gateway device, or the first overload indication information is determined by the gateway device according to a load status of the gateway device and signaling sending statuses of mobility management entities connected to the gateway device.

Optionally, before the receiving, by a mobility management entity, first overload indication information sent by a gateway device, the program further includes: sending, by the mobility management entity, a first path detection request message to the gateway device. The receiving, by a mobility management entity, first overload indication information sent by a gateway device includes: receiving, by the mobility management entity, a first path detection response message sent by the gateway device, where the first path detection response message carries the first overload indication information, and the first overload indication information is determined by the gateway device according to a load status of the gateway device, or the first overload indication information is determined by the gateway device according to a load status of the gateway device and signaling sending statuses of mobility management entities connected to the gateway device.

Optionally, the gateway device is an SGW. Before the receiving, by a mobility management entity, first overload indication information sent by a gateway device, the program further includes: sending, by the mobility management entity, a first control request message to the SGW, so that the SGW sends a second control request message to a packet data network gateway PGW and receives a second control response message sent by the PGW, where the second control response message carries second overload indication information that is determined by the PGW and used to indicate the overload control policy. The receiving, by a mobility management entity, first overload indication information sent by a gateway device includes: receiving, by the mobility management entity, a first control response message sent by the SGW, where the first control response message carries the first overload indication information, and the first overload indication information is the second overload indication information forwarded by the SGW, or the first overload indication information is determined by the SGW according to the second overload indication information and signaling sending statuses of mobility management entities connected to the SGW.

Optionally, the gateway device is an SGW. The receiving, by a mobility management entity, first overload indication information sent by a gateway device includes: receiving, by the mobility management entity, a first path detection message sent by the SGW, where the first path detection message carries the first overload indication information, and the first overload indication information is second overload indication information that is forwarded by the SGW, determined by the PGW, and used to indicate the overload control policy, or the first overload indication information is determined by the SGW according to the second overload indication information and signaling sending statuses of mobility management entities connected to the SGW.

Optionally, the program further includes: receiving, by the mobility management entity, information about a delay timer sent by the gateway device. The executing, by the mobility management entity, the overload control policy according to the first overload indication information includes: executing, by the mobility management entity, the overload control policy according to the first overload indication information before the delay timer expires.

Optionally, the overload control policy includes: limiting a quantity of initial access users, delaying signaling in a mobility management process, delaying signaling in a service request process, or delaying signaling in a session management process.

Optionally, the first overload indication information includes an indication or overload status information associated with the overload control policy. The executing, by the mobility management entity, the overload control policy according to the first overload indication information includes: executing, by the mobility management entity, the overload control policy associated with the indication or the overload status information.

Optionally, the first overload indication information further includes an overload control rate. The executing, by the mobility management entity, the overload control policy according to the first overload indication information includes: executing, by the mobility management entity according to the overload control rate, the overload control policy associated with the indication or the overload status information.

Optionally, before the receiving, by a mobility management entity, first overload indication information sent by a gateway device, the program further includes: sending, by the mobility management entity, a first control signaling message to the gateway device. The receiving, by a mobility management entity, first overload indication information sent by a gateway device includes: receiving, by the mobility management entity, a first control signaling response message that is sent by the gateway device and includes information about a delay timer, where the first control signaling response message indicates that the overload control policy is controlling a signaling process that has a same type as first control signaling. The executing, by the mobility management entity, the overload control policy according to the first overload indication information includes: controlling, by the mobility management entity according to the first control signaling response message, the signaling process that has the same type as the first control signaling.

Optionally, the first control signaling response message further includes an overload control rate. The executing, by the mobility management entity, the overload control policy according to the first overload indication information includes: controlling, by the mobility management entity according to the overload control rate, the signaling process that has the same type as the first control signaling.

It may be learned from the foregoing technical solutions provided in this embodiment of the present invention that in this embodiment of the present invention, overload indication information that is sent by a gateway device and used to indicate an overload control policy is received, and the overload control policy is executed according to the overload indication information, which can avoid adverse impact brought by device overload; therefore, the device overload can be effectively controlled.

Figure 29:
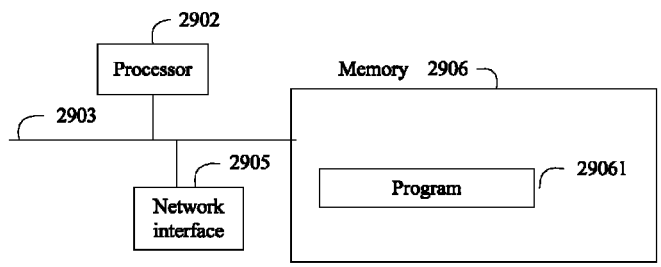
FIG. 29 is a schematic structural diagram of a PGW according to an embodiment of the present invention.

FIG. 29 shows a structure of a PGW according to another embodiment of the present invention. The PGW includes at least one processor 2902 (for example, a CPU), at least one network interface 2905 or another communications interface, a memory 2906, and at least one communications bus 2903 that is configured to implement connection and communication between these apparatuses. The processor 2902 is configured to execute an executable module, for example, a computer program, stored in the memory 2906. The memory 2906 may include a high-speed random access memory (RAM: Random Access Memory), and may further include a non-volatile memory (non-volatile memory), for example, at least one magnetic disk memory. Through at least one network interface 2905 (which may be wired or wireless), a communication connection is implemented between the system gateway and at least one of other network elements over the Internet, a wide area network, a local area network, a metropolitan area network, or the like.

In some implementation manners, a program 29061 is stored in the memory 2906, and the program 29061 may be executed by the processor 2902. This program includes: determining, by a PGW, second overload indication information, where the second overload indication information is used to indicate an overload control policy; and sending, by the PGW, the second overload indication information to a serving gateway SGW, so that the SGW performs overload control according to the second overload indication information.

Optionally, the second overload indication information is used to enable the SGW to determine, according to the second overload indication information, first overload indication information that is to be sent to a mobility management entity and used to indicate the overload control policy; or the second overload indication information is used to enable the SGW to execute the overload control policy according to the second overload indication information.

Optionally, before the determining, by a PGW, second overload indication information, the program further includes: receiving, by the PGW, a second control request message sent by the SGW. The determining, by a PGW, second overload indication information includes: determining, by the PGW, the second overload indication information according to a load status of the PGW. The sending, by the PGW, the second overload indication information to a serving gateway SGW includes: sending, by the PGW, a second control response message to the SGW, where the second control response message carries the second overload indication information.

Optionally, before the determining, by a PGW, second overload indication information, the program further includes: receiving, by the PGW, a second path detection request message sent by the SGW. The determining, by a PGW, second overload indication information includes: determining, by the PGW, the second overload indication information according to a load status of the PGW. The sending, by the PGW, the second overload indication information to a serving gateway SGW includes: sending, by the PGW, a second path detection response message to the SGW, where the second path detection response message carries the second overload indication information.

Optionally, the determining, by the PGW, the second overload indication information according to a load status of the PGW includes: determining, by the PGW, the second overload indication information according to the load status of the PGW and signaling sending statuses of SGWs connected to the PGW.

Optionally, the program further includes: sending, by the PGW, information about a delay timer to the SGW, so that the SGW sends the information about the delay timer and the first overload indication information to the mobility management entity.

Optionally, the overload control policy includes: limiting a quantity of initial access users, delaying signaling in a mobility management process, delaying signaling in a service request process, or delaying signaling in a session management process.

Optionally, the second overload indication information includes an indication or overload status information associated with the overload control policy.

Optionally, the second overload indication information further includes an overload control rate.

Optionally, before the determining, by a PGW, second overload indication information, the program further includes: receiving, by the PGW, a second control signaling message that is sent by the SGW. The determining, by a PGW, second overload indication information includes: determining, by the PGW, the second overload indication information as a second control signaling response message that includes information about a delay timer, where the second overload indication information indicates that the overload control policy is controlling a signaling process that has a same type as the second control signaling.

Optionally, the determining, by the PGW, the second overload indication information as a second control signaling response message that includes information about a delay timer includes: determining, by the PGW, the second overload indication information as the second control signaling response message that includes the information about the delay timer, and an overload control rate.

It may be learned from the foregoing technical solutions provided in this embodiment of the present invention that in this embodiment of the present invention, second overload indication information used to indicate an overload control policy is sent to an SGW, so that the SGW determines, according to the second overload indication information, first overload indication information that is to be sent to a mobility management entity and used to indicate the overload control policy, which can implement control on overload of the PGW and avoid adverse impact brought by device overload; therefore, the device overload can be effectively controlled.

It should be understood that, the term "and/or" in this embodiment of the present invention describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An overload control method, comprising:
   determining, by a gateway device, first overload indication information, wherein the first overload indication information is used to indicate an overload control policy which comprises delaying signaling in a mobility management process, delaying signaling in a service request process, or delaying signaling in a session management process, and the first overload indication information comprises: a delay timer, an indication associated with the overload control policy, and an overload control rate; and
   sending, by the gateway device, the first overload indication information to a mobility management entity, for the mobility management entity to execute the overload control policy associated with the indication according to the overload control rate before the delay timer expires.

2. The method according to claim 1, wherein before determining the first overload indication information, the method further comprises:
   receiving, by the gateway device, a first control request message sent by the mobility management entity;
   wherein determining the first overload indication information comprises:
   determining, by the gateway device, the first overload indication information according to a load status of the gateway device; and
   wherein sending the first overload indication information to the mobility management entity comprises:
   sending, by the gateway device, a first control response message to the mobility management entity, wherein the first control response message carries the first overload indication information.

3. The method according to claim 1, wherein before determining the first overload indication information, the method further comprises:
   receiving, by the gateway device, a first control request message sent by the mobility management entity; and
   wherein the first overload indication information indicates that the overload control policy is controlling a signaling process that has a same type as first control signaling.

4. A gateway device, comprising:
   a processor, configured to determine first overload indication information, wherein the first overload indication information is used to indicate an overload control policy which comprises delaying signaling in a mobility management process, delaying signaling in a service request process, or delaying signaling in a session management process, and the first overload indication information comprises a delay timer, an indication associated with the overload control policy, and an overload control rate; and
   a sender, configured to send the first overload indication information to a mobility management entity, for the mobility management entity to execute the overload control policy associated with the indication according to the overload control rate before the delay timer expires.

5. The gateway device according to claim 4, wherein the gateway device further comprises:
   a receiver, configured to: before the processor determines the first overload indication information, receive a first control request message sent by the mobility management entity;
   wherein the processor is configured to determine the first overload indication information according to a load status of the gateway device; and
   the sender is configured to send a first control response message to the mobility management entity, wherein the first control response message carries the first overload indication information.

6. The gateway device according to claim 4, further comprising:
   a receiver, configured to: before the processor determines the first overload indication information, receive a first control signaling message that is sent by the mobility management entity; and wherein the first overload indication information indicates that the overload control policy is controlling a signaling process that has a same type as first control signaling.

7. An overload control method, comprising:
- receiving, by a mobility management entity, first overload indication information sent by a gateway device, wherein the first overload indication information is used to indicate an overload control policy which comprises: delaying signaling in a mobility management process, delaying signaling in a service request process, or delaying signaling in a session management process, and the first overload indication information comprises: a delay timer, an indication associated with the overload control policy, and an overload control rate; and
- executing, by the mobility management entity, the overload control policy associated with the indication according to the overload control rate before the delay timer expires.

8. The method according to claim 7, wherein before receiving the first overload indication information sent by the gateway device, the method further comprises:
- sending, by the mobility management entity, a first control request message to the gateway device; and
- where receiving the first overload indication information sent by the gateway device comprises:
  - receiving, by the mobility management entity, a first control response message sent by the gateway device, wherein the first control response message carries the first overload indication information, and the first overload indication information is determined by the gateway device according to a load status of the gateway device, or the first overload indication information is determined by the gateway device according to a load status of the gateway device and signaling sending statuses of mobility management entities connected to the gateway device.

9. The method according to claim 7, wherein before receiving the first overload indication information sent by the gateway device, the method further comprises:
- sending, by the mobility management entity, a first control signaling message to the gateway device;
- wherein the first overload indication information indicates that the overload control policy is controlling a signaling process that has a same type as first control signaling; and
- wherein executing the overload control policy according to the first overload indication information comprises:
  - controlling, by the mobility management entity according to the first overload indication information, the signaling process that has the same type as the first control signaling.

10. A mobility management entity, comprising:
- a receiver, configured to receive first overload indication information sent by a gateway device, wherein the first overload indication information is used to indicate an overload control policy which comprises delaying signaling in a mobility management process, delaying signaling in a service request process, or delaying signaling in a session management process, and the first overload indication information comprises a delay timer, an indication associated with the overload control policy, and an overload control rate; and
- a processor, configured to execute the overload control policy associated with the indication according to the overload control rate before the delay timer expires.

11. The mobility management entity according to claim 10, wherein the mobility management entity further comprises:
- a sender, configured to: before receiving the first overload indication information sent by the gateway device, send a first control request message to the gateway device;
- wherein the receiver is configured to receive a first control response message sent by the gateway device, wherein the first control response message carries the first overload indication information, and the first overload indication information is determined by the gateway device according to a load status of the gateway device, or the first overload indication information is determined by the gateway device according to a load status of the gateway device and signaling sending statuses of mobility management entities connected to the gateway device.

12. The mobility management entity according to claim 10, further comprising:
- a sender, configured to: before receiving the first overload indication information sent by the gateway device, send a first control signaling message to the gateway device;
- wherein the first overload indication information indicates that the overload control policy is controlling a signaling process that has a same type as first control signaling; and
- wherein the processor is configured to control, according to the first overload indication information, the signaling process that has the same type as the first control signaling.

13. A system, comprising:
- a gateway device configured to determine first overload indication information, wherein the first overload indication information is used to indicate an overload control policy which comprises delaying signaling in a mobility management process, delaying signaling in a service request process, or delaying signaling in a session management process, and the first overload indication information comprises a delay timer, an indication associated with the overload control policy, and an overload control rate; and send the first overload indication information to a mobility management entity; and
- the mobility management entity configured to receive the first overload indication information sent by the gateway device; and execute the overload control policy associated with the indication according to the overload control rate before the delay timer expires.

14. The system according to claim 13, wherein
- the gateway device is configured to receive a first control request message sent by the mobility management entity before determining the first overload indication information;
- when determining the first overload indication information, the gateway device is configured to determine the first overload indication information according to a load status of the gateway device; and
- when sending the first overload indication information to the mobility management entity, the gateway device is configured to send a first control response message to the mobility management entity, wherein the first control response message carries the first overload indication information.

15. The system according to claim 13, wherein:
- the gateway device is configured to receive a first control request message sent by the mobility management entity before determining the first overload indication information; and the first overload indication information indicates that the overload control policy is controlling a signaling process that has a same type as first control signaling.

* * * * *